United States Patent
Konaka et al.

(10) Patent No.: US 10,724,645 B2
(45) Date of Patent: Jul. 28, 2020

(54) THREE-WAY VALVE

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Masami Konaka, Kariya (JP); Hirofumi Kanazawa, Toyota (JP); Tadao Shimizu, Kariya (JP)

(73) Assignees: DENSO CORPORATION, Kariya, Aichi-pref. (JP); TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 0 days.

(21) Appl. No.: 16/015,266

(22) Filed: Jun. 22, 2018

(65) Prior Publication Data
US 2018/0372232 A1 Dec. 27, 2018

(30) Foreign Application Priority Data

Jun. 26, 2017 (JP) .................. 2017-124571

(51) Int. Cl.
*F16K 11/076* (2006.01)
*F16K 27/06* (2006.01)
*F16K 11/085* (2006.01)

(52) U.S. Cl.
CPC ........ *F16K 11/076* (2013.01); *F16K 11/0853* (2013.01); *F16K 27/065* (2013.01);
(Continued)

(58) Field of Classification Search
CPC .. F16K 11/0853; F16K 27/065; F16K 11/076; Y10T 137/86815;
(Continued)

(56) References Cited

U.S. PATENT DOCUMENTS 2,198,797 A * 4/1940 Sixtensson .............. F23L 15/02
137/602
2,638,112 A * 5/1953 Shelton .................. D06F 39/088
137/216
(Continued)

FOREIGN PATENT DOCUMENTS

JP 2000-274537 A 10/2000
JP 2001-200941 A 7/2001
(Continued)

*Primary Examiner* — Matthew W Jellett
*Assistant Examiner* — Christopher D Ballman
(74) *Attorney, Agent, or Firm* — Harness, Dickey & Pierce, P.L.C.

(57) ABSTRACT

A three-way valve includes an inflow port, a body having therein a valve chamber introducing fluid from an inflow passage of the inflow port; a first outflow port having an outflow passage extending at an acute angle to a reference direction in which the inflow passage extends; a second outflow port having an outflow passage extending from the valve chamber at an acute angle to the reference direction; and a valve element disposed inside the valve chamber and movable to adjust flow rates of the fluid in the first outflow port and the second outflow port. At least one of the first outflow port and the second outflow port includes a bent portion connecting the outflow passage and a downstream passage such that the downstream passage becomes closer to the reference direction than an extending direction of the outflow passage to the reference direction.

14 Claims, 10 Drawing Sheets

(52) U.S. Cl.
CPC .................. *Y10T 137/86815* (2015.04); *Y10T 137/87571* (2015.04); *Y10T 137/87877* (2015.04)

(58) Field of Classification Search
CPC ..... Y10T 137/87877; Y10T 137/87571; Y10T 137/87249
See application file for complete search history.

(56) References Cited

U.S. PATENT DOCUMENTS

| | | | | |
|---|---|---|---|---|
| 3,363,651 | A * | 1/1968 | Boyd | F16K 11/076 137/625.23 |
| 3,386,474 | A * | 6/1968 | Kimmel | B65G 47/766 137/883 |
| 5,617,815 | A * | 4/1997 | Spies | F16K 11/076 123/41.1 |
| 5,911,212 | A * | 6/1999 | Benson | F02B 29/0418 123/563 |
| 6,050,286 | A * | 4/2000 | Kruer | F16K 11/0853 137/119.03 |
| 6,289,913 | B1 | 9/2001 | Babin | |
| 6,321,782 | B1 * | 11/2001 | Hollister | F17C 13/025 137/557 |
| 6,539,899 | B1 * | 4/2003 | Piccirilli | F01P 7/167 123/41.08 |
| 6,581,636 | B2 * | 6/2003 | Carepa | B63C 11/22 128/205.24 |
| 8,051,869 | B2 * | 11/2011 | Parnin | F16K 17/36 137/1 |
| 8,875,544 | B2 * | 11/2014 | Charbonneau | F23D 14/64 431/284 |
| 9,371,921 | B2 * | 6/2016 | Whitaker | F16K 11/085 |
| 9,481,477 | B2 * | 11/2016 | Kjar | C12M 23/40 |
| 10,047,295 | B2 * | 8/2018 | Chun | C10B 15/02 |
| 10,184,574 | B2 * | 1/2019 | Iversen | F16K 11/0873 |
| 2001/0047834 | A1 | 12/2001 | Menin et al. | |
| 2011/0126931 | A1 * | 6/2011 | Ide | F16K 11/065 137/625.47 |

FOREIGN PATENT DOCUMENTS

| | | |
|---|---|---|
| JP | 4357922 B2 | 11/2009 |
| JP | 5871432 B2 | 3/2016 |

\* cited by examiner

US 10,724,645 B2

THREE-WAY VALVE

CROSS REFERENCE TO RELATED APPLICATION

This application is based on and incorporates herein by reference Japanese Patent Application No. 2017-124571 filed on Jun. 26, 2017.

TECHNICAL FIELD

The present disclosure relates to a three-way valve used for distribution or mixing of fluid.

BACKGROUND

Conventionally, a three-way valve is used for distribution or mixing of flows of fluid in a cooling system using coolant water, for example. When the three-way valve distributes a flow of fluid, the three-way valve separates fluid which has flowed therein through a single inflow port into outflow ports which extend in different two directions. At this time, the three-way valve moves a valve element in a valve chamber to adjust a ratio of flow rates of the fluid distributed into the two outflow ports.

Such technology regarding a three-way valve is known in Patent Literature 1 (JP 2001-200941 A corresponding to U.S. Pat. No. 6,289,913 B1). The three-way valve of Patent Literature 1 includes an inlet attachment portion as an inflow port, and a first outlet attachment portion and a second outlet attachment portion as two outflow ports which extend in different directions. The three-way valve separates fluid which has flowed therein from the inlet attachment portion into the first outlet attachment portion and the second outlet attachment portion, respectively.

SUMMARY

In the three-way valve of Patent Literature 1, a valve chamber has a circular cylindrical shape. The inlet attachment portion, the first outlet attachment portion and the second outlet attachment portion are arranged at regular intervals in a circumferential direction of the valve chamber.

Thus, a flow of fluid that has passed through an inlet passage in the inlet attachment portion may greatly curve through the valve chamber toward a first outlet passage in the first outlet attachment portion or a second outlet passage in the second outlet attachment portion. Therefore, in the three-way valve of Patent Literature, a pressure loss may increase at the time of passing through the three-way valve in both cases where the fluid flows from the inlet passage and out of the first outlet passage and where the fluid flows from the inlet passage and out of the second outlet passage.

Further, in the three-way valve of Patent Literature 1, an angle between a direction in which the inlet passage extends and a direction in which the first outlet passage extends is equal to an angle between the direction in which the inlet passage extends and a direction in which the second outlet passage extends. Therefore, an inner pressure loss of the three-way valve when the fluid flows out of the first outlet passage is equivalent to that when the fluid flows out of the second outlet passage.

However, when the three-way valve is actually used, configurations or usages of fluid circuits connected to downstream sides of the two outflow passages are not always equivalent to each other. In other words, a bad required by a configuration located downstream of one of the outflow passages is mostly different from a load required by a configuration located downstream of another of the outflow passages.

Hence, for a three-way valve as in Patent Literature 1, it may need to increase a flow passage area of either one of the outlet passages in order to meet the required loads of the configurations located downstream of the respective outflow passages. Accordingly, a size of the three-way valve may become large.

Furthermore, in the three-way valve of Patent Literature 1, the first outlet passage and the second outlet passage are connected such that a distance therebetween becomes large. Thus, a flow passage which is downstream of the first outlet passage and a flow passage which is downstream of the second outlet passage are basically disposed to be further away from each other. Hence, the three-way valve of Patent Literature 1 may cause an area occupied by a fluid circuit including the three-way valve to become large.

A first object of the present disclosure is to provide a three-way valve capable of appropriately adjusting a pressure loss at a time of distributing fluid, and contributing to reduction in size.

A three-way valve as in Patent Literature 1 is used not only to distribute fluid in a fluid circuit but also to mix the fluid. When the fluid is mixed, an inner pressure loss varies depending on flow rates of the fluid flowing in through two inflow ports and may cause a negative influence on configurations which are upstream of the respective inflow ports. A second object of the present disclosure is to provide a three-way valve capable of appropriately adjusting a pressure loss at a time of mixing fluid, and contributing to reduction in size.

The present disclosure provides a three-way valve used for distribution or mixing of flows of fluid, and the three-way valve is capable of appropriately adjusting a pressure loss at a time of passing through the three-way valve and contributing to reduction in size.

According to a first aspect of the present disclosure, a three-way valve includes: an inflow port having an inflow passage configured to let fluid flow thereinto; a body having therein a valve chamber configured to introduce therein the fluid which has passed through the inflow passage of the inflow port; a first outflow port having an outflow passage extending at an acute angle to a reference direction in which the inflow passage extends, the first outflow port being configured to let the fluid flow from the valve chamber to a predetermined first flow path system; a second outflow port having an outflow passage extending from the valve chamber at an acute angle to the reference direction, the second outflow port being configured to let the fluid flow from the valve chamber to a second flow path system which is different from the first flow path system; and a valve element disposed inside the valve chamber and movable to adjust flow rates of the fluid in the first outflow port and the second outflow port. At least one of the first outflow port and the second outflow port includes: a downstream passage configured to allow the fluid pass therethrough after the outflow passage; and a bent portion disposed downstream of the outflow passage in a flow of the fluid and connecting the outflow passage and the downstream passage such that the downstream passage becomes closer to the reference direction than a direction in which the outflow passage extends is to the reference direction.

According to a second aspect of the present disclosure, the three-way valve includes: an inflow port having an inflow passage configured to let fluid flow thereinto; a body having therein a valve chamber configured to introduce therein the fluid which has passed through the inflow passage of the inflow port; a first outflow port having an outflow passage extending at an acute angle to a reference direction in which the inflow passage extends, the first outflow port being configured to let the fluid flow from the valve chamber to a predetermined first flow path system; a second outflow port having an outflow passage extending from the valve chamber at an acute angle to the reference direction, the second outflow port being configured to let the fluid flow from the valve chamber to a second flow path system which is different from the first flow path system; and a valve element disposed inside the valve chamber and movable to adjust flow rates of the fluid in the first outflow port and the second outflow port. A pressure loss of the first flow path system is larger than a pressure loss of the second flow path system. A first angle between the outflow passage of the first outflow port and the reference direction is smaller than a second angle between the outflow passage of the second outflow port and the reference direction.

According to a third aspect of the present disclosure, the three-way valve includes: an outflow port having an outflow passage configured to let fluid flow out thereof; a body having therein a valve chamber configured to introduce therein the fluid and connected to the outflow passage of the outflow port; a first inflow port having an inflow passage extending at an acute angle to a reference direction in which the outflow passage extends, the first inflow port being configured to let the fluid flow into the valve chamber from a predetermined first flow path system; a second inflow port having an inflow passage extending from the valve chamber at an acute angle to the reference direction, the second inflow port being configured to let the fluid flow into the valve chamber from a second flow path system which is different from the first flow path system; and a valve element disposed inside the valve chamber and movable to adjust flow rates of the fluid from the first inflow port and the second inflow port. At least one of the first inflow port and the second inflow port includes: an upstream passage configured to allow the fluid pass therethrough before the inflow passage; and a bent portion disposed upstream of the inflow passage in a flow of the fluid and connecting the inflow passage and the upstream passage such that the upstream passage becomes closer to the reference direction than a direction in which the inflow passage extends is to the reference direction.

DETAILED DESCRIPTION

Figure 1:
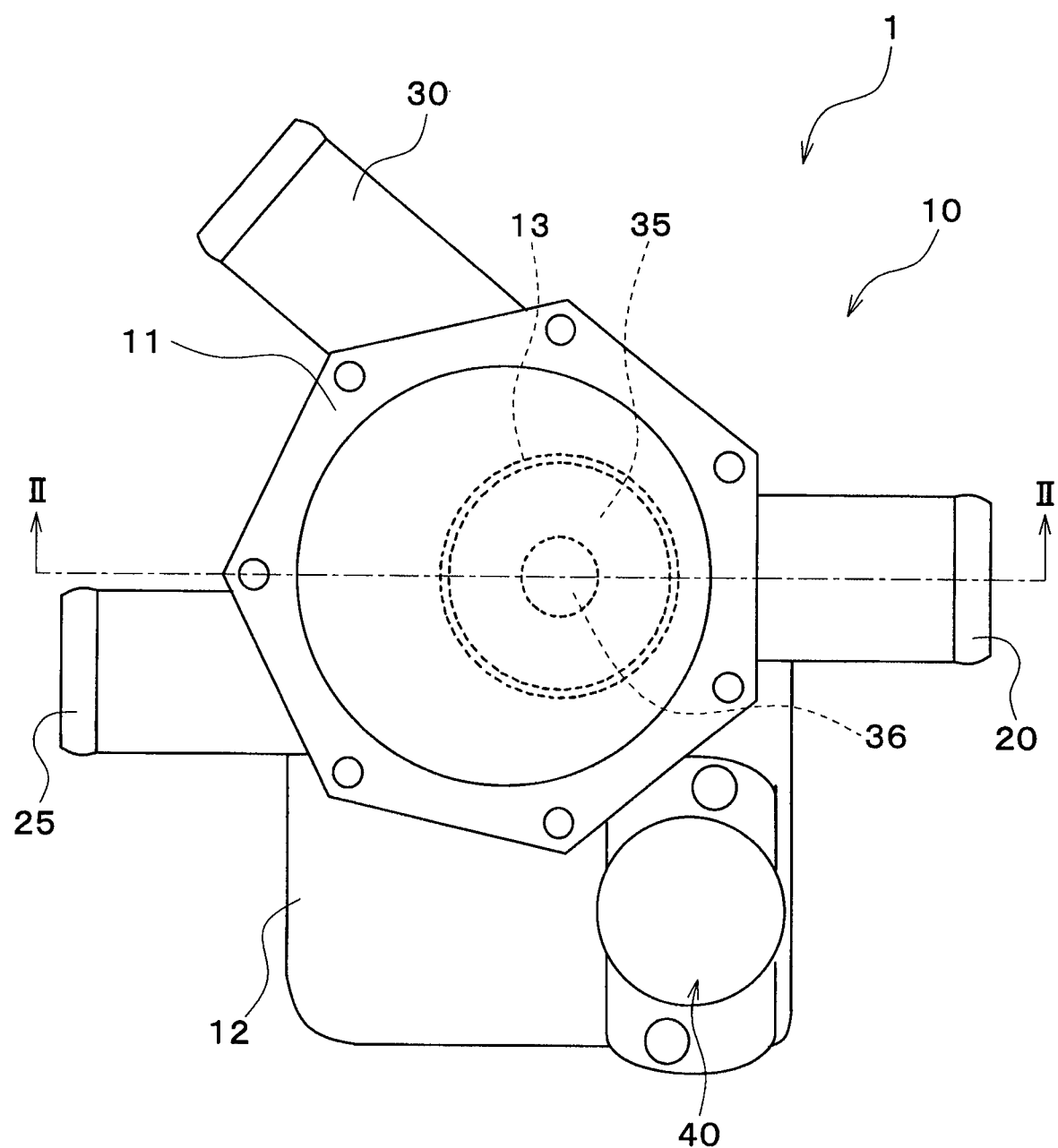
FIG. 1 is a top view showing a schematic configuration of a three-way valve according to a first embodiment.

Embodiments of the present disclosure will be described hereinafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

First, a schematic configuration of a three-way valve 1 according to a first embodiment will be described with reference to the drawings. The three-way valve 1 according to the first embodiment is mounted on an electric vehicle (fuel cell vehicle) that runs using a fuel cell 51 as a power source. The three-way valve 1 constitutes a part of a cooling water circuit 50 used for cooling the fuel cell 51.

In the electric vehicle, the fuel cell 51 generates electric power utilizing a chemical reaction between hydrogen and oxygen, and supplies the electric power to an electric device (not shown) such as a vehicle-running electric motor or a battery in an electric vehicle. The fuel cell 51 generates heat associated with the chemical reaction between hydrogen and oxygen at the time of generating the electric power by the chemical reaction.

Figure 2:
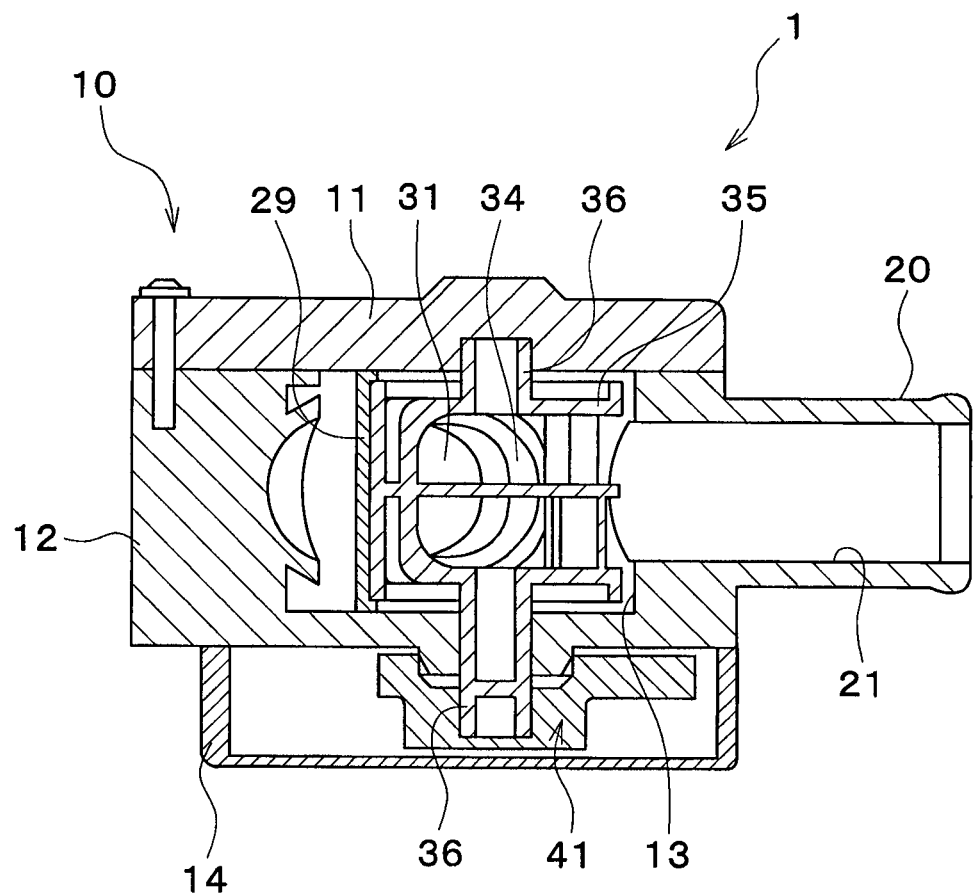
FIG. 2 is a cross-sectional view taken along a line II-II in FIG. 1.
Figure 3:
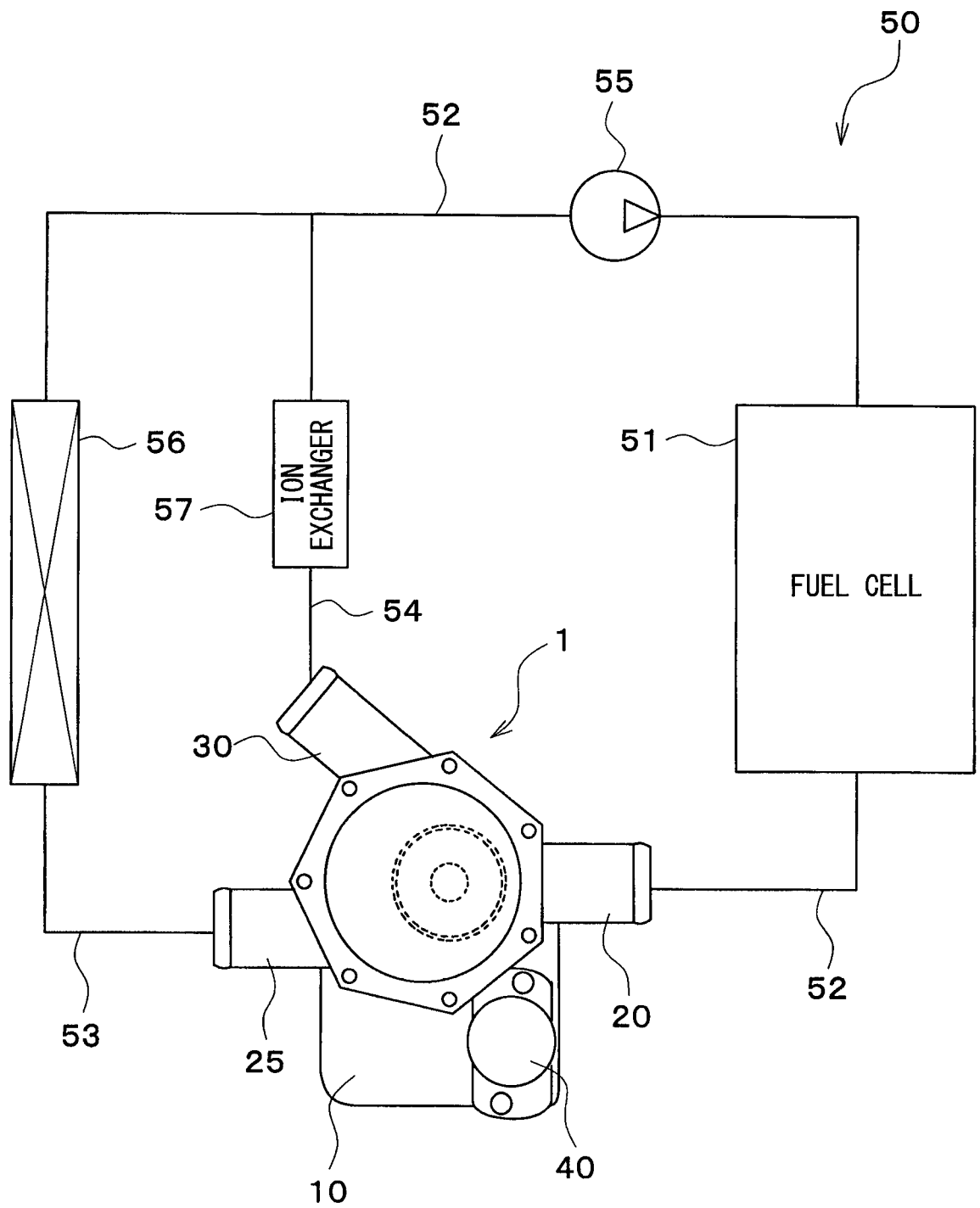
FIG. 3 is a circuit configuration diagram showing a cooling water circuit including the three-way valve according to the first embodiment.

The cooling water circuit 50 is a circuit for cooling, using cooling water as a heat exchange medium, the fuel cell 51 warmed by the heat generated by the electrochemical reaction. As shown in FIGS. 1 to 3, the three-way valve 1 according to the first embodiment has a configuration in which an inflow port 20, a first outflow port 25, a second outflow port 30 are connected to a valve chamber 13 provided inside a body 10. The three-way valve 1 is disposed at a branch point of flow of the cooling water in the cooling water circuit 50.

The three-way valve 1 moves a valve element 35 disposed inside the valve chamber 13 to adjust a flow rate of the cooling water flowing out from the first outflow port 25 and a flow rate of the cooling water flowing out from the second outflow port 30, thereby controlling the flow of the cooling water in the cooling water circuit 50.

First, a configuration of the cooling water circuit 50, in which the three-way valve 1 according to the first embodiment is disposed, will be described with reference to FIG. 3. First, the fuel cell 51 to be cooled by the cooling water circuit 50 will be described.

As described above, the fuel cell 51 is a fuel cell (FC stack) that generates electric power utilizing a chemical reaction between hydrogen and oxygen, and includes a solid polymer electrolyte fuel cell (PEFC). The fuel cell 51 is formed by combining a lot of cells, and each cell is formed by sandwiching an electrolyte membrane between a pair of electrodes.

Air, which contains oxygen, and hydrogen are supplied to the fuel cell 51 through an air passage and a hydrogen passage (not shown). In the fuel cell 51, the following electrochemical reactions of hydrogen and oxygen occur due to the supplied oxygen and hydrogen, and electric energy is generated. Unreacted oxygen and hydrogen not used in these electrochemical reactions are discharged from the fuel cell 51.

$$H_2 \rightarrow 2H^+ + 2e^- \quad \text{(Anode Side)}$$

$$2H^+ + \tfrac{1}{2}O_2 + 2e^- \rightarrow H_2O \quad \text{(Cathode Side)}$$

For these electrochemical reactions, the electrolyte membrane in the fuel cell 51 is in a wet state containing moisture. Thus, the air and hydrogen to be supplied to the fuel cell 51 are humidified, and these humidified gases are supplied to the fuel cell 51. Accordingly, the electrolyte membrane in the fuel cell 51 is humidified.

In the fuel cell 51, heat and moisture are generated by the electrochemical reactions at the time of power generation. Considering the power generation efficiency of the fuel cell 51, the fuel cell 51 is maintained at a constant temperature (for example, about 80° C.) while performing power generation by the electrochemical reactions. In addition, the electrolyte membrane inside the fuel cell 51 may be destroyed by high temperature when it exceeds a predetermined allowable upper limit temperature. Therefore, the temperature of the fuel cell 51 is kept below the allowable upper limit temperature.

Next, the configuration of the cooling water circuit 50 for cooling the fuel cell 51 will be described with reference to the drawings. As shown in FIG. 3, the cooling water circuit 50 is configured to circulate the cooling water as a heat medium to the fuel cell 51, a cooling water pump 55, a radiator 56 as a cooling device, and an ion exchanger 57.

The cooling water circuit 50 plays a role of controlling the temperature of the fuel cell 51 by cooling the fuel cell 51. A mixed solution of ethylene glycol and water, for example, can be used as the cooling water which is a heat medium flowing in the cooling water circuit 50 to prevent freezing at a low temperature.

The flow path of the cooling water in the cooling water circuit 50 according to the first embodiment includes a cooling water flow path 52, a radiator-side flow path 53, and a bypass flow path 54. The fuel cell 51 and the cooling water pump 55 are connected to the cooling water flow path 52. The radiator 56 is disposed on the radiator-side flow path 53, and the ion exchanger 57 is disposed on the bypass flow path 54.

In the cooling water circuit 50, one end side of the cooling water flow path 52 is connected to the inflow port 20 of the three-way valve 1. One end side of the radiator-side flow path 53 is connected to the first outflow port 25 of the three-way valve 1, and one end side of the bypass flow path 54 is connected to the second outflow port 30 of the three-way valve 1. Further, another end side of the cooling water flow path 52 is connected to another end side of the radiator-side flow path 53 and another end side of the bypass flow path 54.

That is, the cooling water circuit 50 has a circulation flow path in which the radiator 56 and the ion exchanger 57 are connected in parallel and the cooling water is circulated thereto. The three-way valve 1 is disposed at a branch point of flow of the cooling water in the cooling water circuit 50.

The cooling water flow path 52 is connected to an inside of an external casing of the fuel cell 51. A flow path through which the cooling water flows as a heat medium is formed in the external casing of the fuel cell 51. The circulating cooling water controls (reduces) a temperature of the fuel cell 51 to a predetermined temperature or lower.

The radiator-side flow path 53 is connected to the first outflow port 25 of the three-way valve 1 while the three-way valve 1 is connected to an end portion of the cooling water flow path 52. The radiator-side flow path 53 is connected to the radiator 56 such that the cooling water passes through an inside of the radiator 56.

On the other hand, the bypass flow path 54 is connected to the second outflow port 30 of the three-way valve 1, and the bypass flow path 54 is connected to the ion exchanger 57 so that the cooling water passes through an inside of the ion exchanger 57. The bypass flow path 54 is configured as a flow passage that bypasses the radiator 56 in the cooling water flow path 52.

Therefore, the flow paths of the cooling water are connected in the cooling water circuit 50 such that the cooling water branches into the radiator-side flow path 53 and the bypass flow path 54 at the three-way valve 1, and then the branched cooling waters merge with each other between a suction side of the cooling water pump 55 and outflow sides of the radiator 56 and the ion exchanger 57.

In the cooling water circuit 50, the cooling water pump 55 is an electric fluid machine driven by an electric motor (not shown). The cooling water pump 55, by its operation, pumps and circulates the cooling water in the cooling water circuit 50. The operation of the cooling water pump 55 is controlled by a control device (not shown), and a temperature control of the cooling water in the cooling water circuit 50 is performed by a control of a flow rate of the cooling water by the cooling water pump 55 and a control of an amount of air sent to the radiator 56.

The radiator 56 is a heat exchanger configured to radiate heat generated in the fuel cell 51 to an outside. In a process of flowing through fuel cell 51, the cooling water in the cooling water flow path 52 absorbs heat caused by the electrochemical reactions and flows out, and flows into the radiator 56 via the cooling water flow path 52. The radiator 56 performs heat exchange between the cooling water and an atmosphere to radiate heat of the cooling water to the atmosphere. Thereafter, the cooling water flows from the radiator 56 toward the fuel cell 51 and circulates through the cooling water circuit 50.

That is, the radiator 56 radiates the heat generated by the electrochemical reactions of the fuel cell 51 through the heat exchange with the cooling water as the heat medium. Further, a fan (not shown) is disposed in the radiator 56. The fan blows an outside air, which is a heat exchange target, to the radiator 56, thereby assisting the heat exchange of the cooling water in the radiator 56.

Inside the radiator 56, an internal flow path through which cooling water passes is formed. This internal flow path includes a large number of thin flow paths in order to increase a heat exchange efficiency between the cooling water and the outside air. Therefore, a pressure loss of the radiator 56 in the cooling water circuit 50 shows a relatively large value.

The ion exchanger 57 is disposed on the bypass flow path 54 and is configured to allow the cooling water flowing in the bypass flow path 54 to pass through an inside of the ion exchanger 57. Since the ion exchanger 57 has an ion exchange resin built therein, the cooling water passing through the inside of the ion exchanger 57 is in contact with the ion exchange resin. Ions in the cooling water are adsorbed by the ion exchange resin and removed from the cooling water that has passed through the second outflow port 30.

Figure 6:
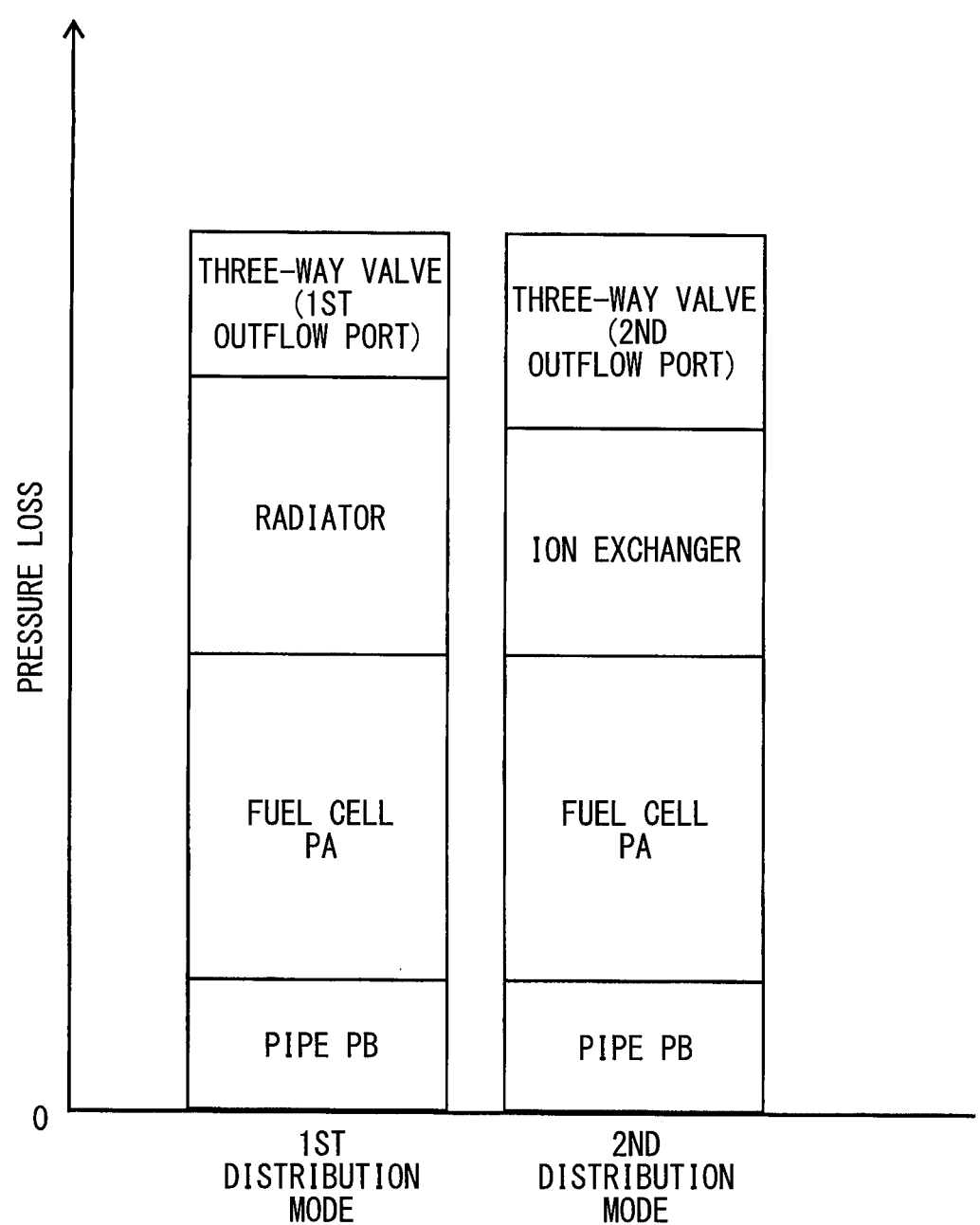
FIG. 6 is an explanatory diagram showing pressure losses in the first distribution mode and the second distribution mode in the cooling water circuit according to the first embodiment.

It should be noted that the pressure loss of the ion exchanger 57 in the cooling water circuit 50 only has to be able to adsorb and remove ions from the cooling water passing through the ion exchanger 57. Therefore, as shown in FIG. 6, the pressure loss of the ion exchanger 57 shows a smaller value than that of the radiator 56.

Figure 4:
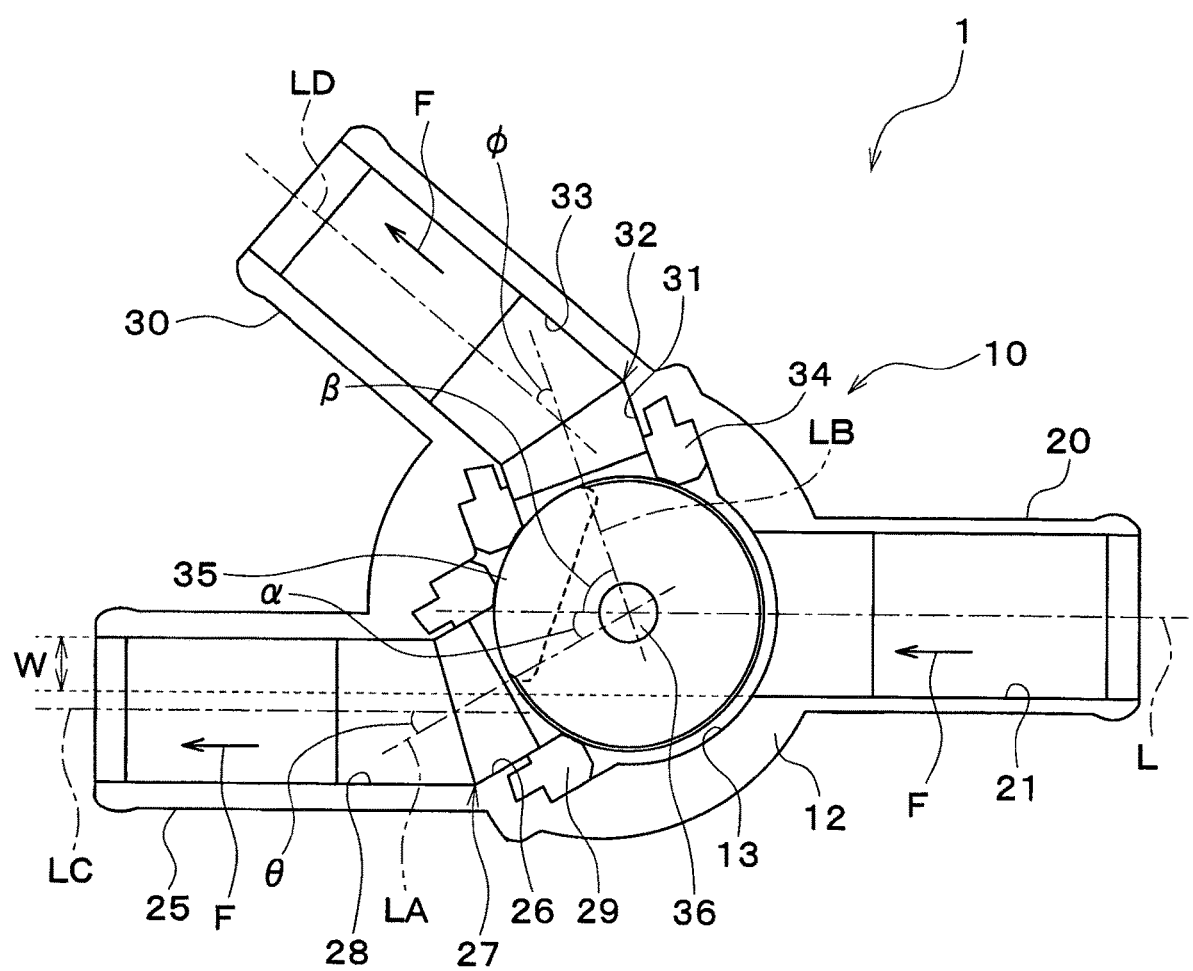
FIG. 4 is a cross-sectional view showing an internal configuration of the three-way valve according to the first embodiment.

Next, a specific configuration of the three-way valve 1 according to the first embodiment will be described in detail with reference to FIGS. 1 to 4. In FIG. 4, flows of the cooling water in the three-way valve 1 according to the first embodiment are indicated by arrows F.

As described above, in order to adjust a flow rate balance of the cooling waters toward the radiator 56 and toward the bypass flow path 54 in the cooling water circuit 50, the three-way valve 1 according to the first embodiment is disposed at the branch point where the cooling water from the cooling water flow path 52 branches into the radiator-side flow path 53 and the bypass flow path 54.

As shown in FIGS. 1 and 2, the three-way valve 1 has a configuration where the inflow port 20, the first outflow port 25, and the second outflow port 30 are each connected to the valve chamber 13 formed in the body 10. The three-way valve 1 moves the valve element 35 inside the valve chamber 13, thereby being capable of adjusting a flow rate distribution of the cooling water flowing from the inflow port 20 toward the first outflow port 25 and the second outflow port 30.

The body 10 constitutes an outer shell of the three-way valve 1, and includes a cover 11, a main body 12, and a gear cover 14. On one surface side of the main body 12, a cylindrical recess is formed, and the cover 11 is attached to the opening of the recess. That is, the valve chamber 13 of the three-way valve 1 is defined by an inside of the recess of the main body 12 and the cover 11. Hence, the valve chamber 13 is a cylindrical space formed between the cover 11 and the main body 12.

The inflow port 20, the first outflow port 25, and the second outflow port 30 are connected to the valve chamber 13, and the cooling water circulating through the cooling water circuit 50 can flow into and out of the valve chamber 13.

The valve element 35 having a cylindrical shape is disposed inside the valve chamber 13. As shown in FIG. 2, the valve element 35 is rotatable around a rotary shaft 36 formed along the center of the valve element 35. The valve element 35 rotates about the rotary shaft 36 inside the valve chamber 13, whereby a flow passage area at the first outflow port 25 and a flow passage area at the second outflow port 30 can be adjusted.

As shown in FIG. 2, the gear cover 14 is attached to a side of the main body 12 facing away from the cover 11. A gear mechanism portion 41 is disposed in a space between the main body 12 and the gear cover 14.

The gear mechanism portion 41 includes multiple gears attached in a row to the main body 12. One of the gears of the gear mechanism portion 41 is connected to an end portion of the rotary shaft 36 of the valve element 35, and another of the gears is connected to a drive shaft of an electric motor 40 attached to the main body 12. Therefore, the three-way valve 1 can transmit driving force of the electric motor 40 to the rotary shaft 36 of the valve element 35 through the gear mechanism portion 41, and rotate the valve element 35 inside the valve chamber 13.

The three-way valve 1 adjusts the position of the valve element 35 in the valve chamber 13 by controlling an operation of the electric motor 40 attached to the main body 12. Accordingly, the three-way valve 1 is capable of adjusting flow path areas of the first outflow port 25 and the second outflow port 30.

As shown in FIGS. 1 to 4, the three-way valve 1 has the inflow port 20. The inflow port 20 is formed in a circular tube shape connecting an inside of the valve chamber 13 of the three-way valve 1 and the cooling water circuit 50. The inflow port 20 extends linearly in a predetermined direction. An inside of the inflow port 20 having a circular tube shape forms an inflow passage 21 and guides the cooling water flowing through the cooling water flow path 52 of the cooling water circuit 50 into the inside of the valve chamber 13. The inflow port 20 functions as an example of an inflow port having an inflow passage through which a fluid flows, and the inflow passage 21 functions as an example of the inflow passage of the inflow port.

In the first embodiment, as shown in FIG. 4, a direction in which the central axis of the inflow passage 21 in the inflow port 20 extends is referred to as a reference direction L. The reference direction L corresponds to a reference direction in which the above-described inflow passage extends.

The first outflow port 25 extends in a direction opposite to the direction in which the inflow port 20 extends with respect to the valve chamber 13. The first outflow port 25 is formed in a circular tube shape connecting the inside of the valve chamber 13 of the three-way valve 1 and the cooling water circuit 50. The first outflow port 25 includes therein a first outflow passage 26, a bent portion 27, and a first downstream passage 28. The first outflow port 25 guides the cooling water flowing out of the valve chamber 13 to the radiator-side flow path 53 of the cooling water circuit 50.

The first outflow passage 26 is a flow passage in the first outflow port 25, through which the cooling water passes when flowing out of the valve chamber 13. The first outflow passage 26 linearly extends in a direction different from the reference direction L of the inflow port 20. As shown in FIG. 4, the extending direction of the central axis of the first outflow passage 26 in the first outflow port 25 is a first outflow direction LA.

The first outflow direction LA intersects the reference direction L at an acute angle on the side opposite to the direction in which the inflow port 20 extends. The first outflow direction LA is tilted by the acute angle from the reference direction L. In the first embodiment, the angle between the reference direction L and the first outflow direction LA on the side opposite to the inflow port 20 is referred to as a first angle α.

A first seal member 29 made of rubber is disposed at an end portion of the first outflow passage 26 facing the valve chamber 13. The first seal member 29 is arranged over an entire opening edge of the first outflow passage 26 facing the valve chamber 13. The first seal member 29 is configured to be capable of being brought into contact with an outer circumferential surface of the valve element 35 disposed in the valve chamber 13. A surface treatment such as coating with a fluorine-based resin may be applied to a surface of the first seal member 29 in order to reduce friction with the valve element 35.

Therefore, the three-way valve 1 is capable of shutting off the cooling water flowing from the valve chamber 13 toward the first outflow passage 26 by changing the position of the valve element 35 in the valve chamber 13 and bringing an entire periphery of an end of the first seal member 29 into contact with the outer circumferential surface of the valve element 35.

As shown in FIG. 4, a downstream end part of the first outflow passage 26 in the flow of the cooling water is disposed so as to overlap the inflow passage 21 of the inflow port 20 with respect to a direction orthogonal to a flow direction of the cooling water passing through the first outflow port 25 from the inflow port 20 (i.e. the vertical direction in FIG. 4).

In other words, a part of the first outflow passage 26 of the first outflow port 25 corresponding to the overlapping width W shown in FIG. 4 is positioned on an extension line of the inflow passage 21 of the inflow port 20 which is extended through the valve chamber 13. Therefore, the three-way valve 1 can smooth the flow of the cooling water passing from the inflow passage 21 of the inflow port 20 to the first outflow passage 26 of the first outflow port 25.

The bent portion 27 and the first downstream passage 28 are disposed downstream of the first outflow passage 26 of the first outflow port 25 in flow of the cooling water. The first downstream passage 28 is a cylindrical flow passage located downstream of the first outflow passage 26 in flow of the cooling water. The first downstream passage 28 extends linearly from a downstream end portion of the first outflow passage 26. As shown in FIG. 4, the extending direction of the central axis of the first downstream passage 28 in the first outflow port 25 is a first downstream direction LC.

The first downstream passage 28 guides the cooling water, which has passed through the first outflow passage 26, to an outside of the first outflow port 25 (i.e. the radiator-side flow path 53 in the cooling water circuit 50). The first downstream passage 28 corresponds to a downstream passage of the first outflow port.

The bent portion 27 is disposed at the downstream end portion of the first outflow passage 26 in flow of the cooling water. The bent portion 27 connects the first outflow passage 26 and the first downstream passage 28 such that the first downstream passage 28 is inclined from the first outflow passage 26. The bent portion 27 connects the first outflow passage 26 and the first downstream passage 28 such that the first downstream direction LC of the first downstream passage 28 is closer to the reference direction L of the inflow passage 21 than the first outflow direction LA of the first outflow passage 26 is to the reference direction L. In other words, an acute angle between the first downstream direction LC and the reference direction L is smaller than an acute angle between the first outflow direction LA and the reference direction L.

As shown in FIG. 4, the bent portion 27 connects the first downstream passage 28 to the first outflow passage 26 such that the first outflow direction LA of the first outflow passage 26 crosses at an acute angle the first downstream direction LC of the first downstream passage 28. In the first embodiment, the angle formed between the first outflow direction LA and the first downstream direction LC is referred to as a first downstream angle θ.

In the first embodiment, the bent portion 27 connects the first outflow passage 26 and the first downstream passage 28 so that the first downstream angle θ becomes the same value as the first angle α. As a result, the first downstream direction LC of the first downstream passage 28 is parallel to the reference direction L of the inflow passage 21 of the inflow port 20. That is, the first downstream passage 28 extends parallel to the inflow passage 21.

The second outflow port 30 extends in a direction opposite to the direction in which the inflow port 20 extends with respect to the valve chamber 13. The extending direction of the second outflow port 30 is different from that of the first outflow port 25. The second outflow port 30 is formed in a circular tube shape connecting the inside of the valve chamber 13 of the three-way valve 1 and the cooling water circuit 50. The second outflow port 30 includes therein a second outflow passage 31, a bent portion 32, and a second downstream passage 33. The second outflow port 30 guides the cooling water flowing out of the valve chamber 13 to the bypass flow path 54 of the cooling water circuit 50.

The second outflow passage 31 is a flow passage in the second outflow port 30, through which the cooling water passes when flowing out of the valve chamber 13. The second outflow passage 31 linearly extends in a direction different from the reference direction L of the inflow port 20 and first outflow direction LA of the first outflow port 25. As shown in FIG. 4, the extending direction of the central axis of the second outflow port 30 in the second outflow passage 31 is a second outflow direction LB.

The second outflow direction LB intersects the reference direction L at an acute angle on the side opposite to the direction in which the inflow port 20 extends. The second outflow direction LB is tilted by the acute angle from the reference direction L. In the first embodiment, the angle between the reference direction L and the second outflow direction LB on the side opposite to the inflow port 20 is referred to as a second angle β. The second angle β is larger than the first angle α of the first outflow port 25.

A second seal member 34 made of rubber is disposed at an end portion of the second outflow passage 31 facing the valve chamber 13. The second seal member 34 is arranged over an entire opening edge of the second outflow passage 31 facing the valve chamber 13. The second seal member 34 is configured to be capable of being brought into contact with the outer circumferential surface of the valve element 35 disposed in the valve chamber 13. A surface treatment such as coating with a fluorine-based resin may be applied also to a surface of the second seal member 34 in order to reduce friction with the valve element 35.

Therefore, the three-way valve 1 is capable of shutting off the cooling water flowing from the valve chamber 13 toward the second outflow passage 31 by changing the position of the valve element 35 in the valve chamber 13 and bringing an entire periphery of an end of the second seal member 34 into contact with the outer circumferential surface of the valve element 35.

In the second outflow port 30, the bent portion 32 and the second downstream passage 33 are disposed downstream of the second outflow passage 31 in flow of the cooling water. The second downstream passage 33 is a flow passage located downstream of the second outflow passage 31 in flow of the cooling water. The second downstream passage 33 extends linearly from a downstream end portion of the second outflow passage 31. As shown in FIG. 4, the extending direction of the central axis of the second downstream passage 33 in the second outflow port 30 is a second downstream direction LD.

The second downstream passage 33 guides the cooling water, which has passed through the second outflow passage 31, to an outside of the second outflow port 30 (i.e. the bypass flow path 54 in the cooling water circuit 50). The second downstream passage 33 corresponds to a downstream passage of the second outflow port.

The bent portion 32 is disposed at the downstream end portion of the second outflow passage 31 in flow of the cooling water. The bent portion 32 connects the second outflow passage 31 and the second downstream passage 33 such that the second downstream passage 33 is inclined from the second outflow passage 31. The bent portion 32 connects the second outflow passage 31 and the second downstream passage 33 such that the second downstream direction LD of the second downstream passage 33 is closer to the reference direction L of the inflow passage 21 than the second outflow direction LB of the second outflow passage 31 is to the reference direction L.

As shown in FIG. 4, the bent portion 32 connects the second downstream passage 33 to the second outflow passage 31 such that the second outflow direction LB of the second outflow passage 31 crosses at an acute angle the second downstream direction LD of the second downstream passage 33. In the first embodiment, the angle formed between the second outflow direction LB and the second downstream direction LD is referred to as a second downstream angle φ.

As a result, the second downstream passage 33 extends so as to be closer to the first outflow port 25 than an extension line of the second outflow passage 31 (i.e. the second outflow direction LB). Therefore, the three-way valve 1 can contribute to downsizing of itself. Further, since it is possible to arrange flow paths with a small interval therebetween on downstream sides of the first outflow port 25 and the second outflow port 30 (i.e. the radiator-side flow path 53 and the bypass flow path 54). The arrangement space of the cooling water circuit 50 can be reduced.

A control device (not shown) controlling the operation of the electric motor 40 enables the three-way valve 1 to distribute the cooling water flowing therein from the inflow port 20 to the first outflow port 25 and the second outflow port 30 at adjusted flow rates. In the first embodiment, three modes: a first distribution mode, a second distribution mode, and an equal distribution mode, will be described as examples of a distribution mode of the cooling water by the three-way valve 1.

Figure 5:
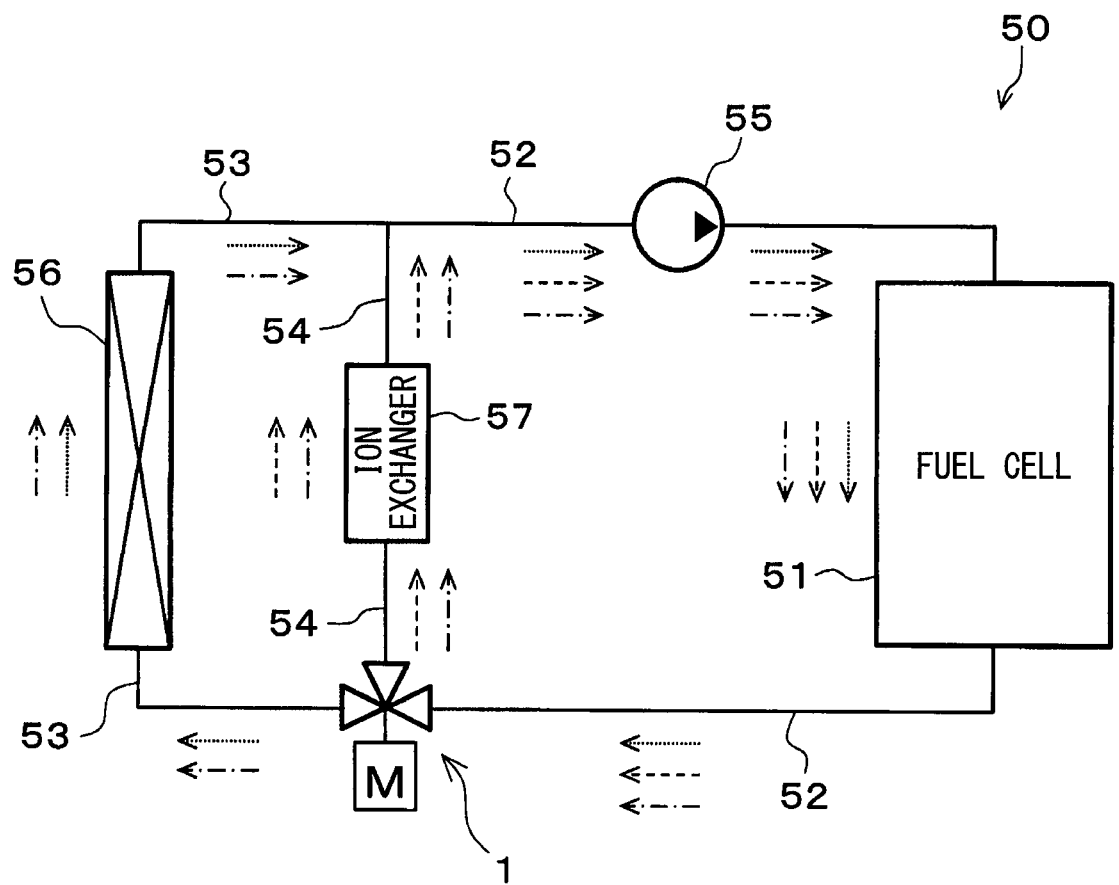
FIG. 5 is an explanatory diagram showing a flow of cooling water for each distribution mode in the cooling water circuit according to the first embodiment.

As shown in FIG. 5, in the first distribution mode, the cooling water is distributed such that the entire amount of the cooling water circulating in the cooling water circuit 50 passes through the first outflow port 25 and the radiator 56. That is, in this case, the valve element 35 inside the valve chamber 13 is rotated so that the first outflow passage 26 is fully open and the second outflow passage 31 is fully closed.

The flow of the cooling water in the cooling water circuit 50 in the first distribution mode of the three-way valve 1 will be described. In the cooling water circuit 50, the cooling water in the cooling water flow path 52 is pumped by the cooling water pump 55 and passes through a flow path in the external casing of the fuel cell 51.

At this time, the cooling water absorbs heat of the fuel cell 51 generated by the electrochemical reactions, and then flows out to the outside of the external casing. The cooling water flowing out of the fuel cell 51 flows into the valve chamber 13 from the cooling water flow path 52 through the inflow port 20 of the three-way valve 1.

Here, in the first distribution mode, since the valve element 35 fully closes the second outflow passage 31, the cooling water flows from the inside of the valve chamber 13 to the first outflow passage 26, the bent portion 27 and the first downstream passage 28, and then flows out to the radiator-side flow path 53.

The cooling water flowing into the radiator-side flow path 53 passes through the radiator 56 and flows into the cooling water flow path 52 again. When passing through the radiator 56, the cooling water exchanges heat with an ambient atmosphere air around the radiator 56. Accordingly, the heat of the cooling water is radiated to the atmosphere air. Thereafter, the cooling water flowing into the cooling water flow path 52 is sucked in from a suction port of the cooling water pump 55 and pumped toward the fuel cell 51.

As a result, the cooling water circulates in the cooling water circuit 50 in the first distribution mode such that the cooling water passes through the fuel cell 51, the three-way valve 1, the radiator-side flow path 53 and the radiator 56. In the first embodiment, the flow path of the cooling water flowing in such state of the cooling water circuit 50 is referred to as a first flow path system.

The first distribution mode is a distribution mode of the three-way valve 1 selected by the control device when a temperature of the fuel cell 51 exceeds a predetermined temperature in accordance with the power generation and the fuel cell 51 needs to be cooled.

The pressure loss in the cooling water circuit 50 in the first distribution mode will be described with reference to FIG. 6. FIG. 6 is a bar graph showing pressure losses in respective parts when the cooling water pump 55 in the cooling water circuit 50 pumps the cooling water at a predetermined condition (for example, at a predetermined pressure and at a flow rate of 200 L/min). The bar graph is expressed in correspondence with magnitudes of the respective pressure losses.

The pressure loss of the fuel cell 51 in this first distribution mode shows a predetermined value based on, for example, a shape of the flow path in the external casing in a state where the entire amount of the cooling water passes through the fuel cell 51. The pressure loss of the fuel cell 51 in this case is defined as PA. The pressure loss of a pipe in the first distribution mode shows a certain value based on the lengths and configurations of the cooling water flow path 52 and the radiator-side flow path 53. The pressure loss of the pipe in this case is defined as PB.

In the first distribution mode, the entire amount of the cooling water in the cooling water circuit 50 passes through the radiator 56. An internal flow path of the radiator 56 includes a large number of thin flow paths in order to increase a heat exchange efficiency between the cooling water passing through the inside of the radiator 56 and the outside air.

Therefore, a water flow resistance of the radiator 56 in the cooling water circuit 50 is larger than that of the ion exchanger 57 connected in parallel with the radiator 56. A pressure loss of the radiator 56 in the first distribution mode indicates a larger value (e.g. 50 kPa) than that of the ion exchanger 57.

In the three-way valve 1 of the first distribution mode, the cooling water flows into the inside of the valve chamber 13 from the inflow passage 21 of the inflow port 20, and then the entire amount of the cooling water passes through the first outflow passage 26, the bent portion 27, and the first downstream passage 28 of the first outflow port 25.

As shown in FIG. 4, the first outflow passage 26 of the first outflow port 25 extends so as to be at an acute angle to the inflow passage 21 of the inflow port 20, and the first outflow direction LA is inclined by the first angle α from the reference direction L. Therefore, according to the three-way valve 1, a curve from the inflow passage 21 of the inflow port 20 toward the first outflow passage 26 of the first outflow port 25 can be kept gentle. Thus, the pressure loss at the time of flowing from the inflow channel 21 to the first outflow passage 26 can be reduced.

Further, a part of the first outflow passage 26 of the first outflow port 25 corresponding to the overlapping width W shown in FIG. 4 is positioned on an extension line of the inflow passage 21 of the inflow port 20 which is extended through the valve chamber 13. As a result, the part corresponding to the overlapping width W is disposed between the inflow channel 21 and the first outflow passage 26. Hence, the flow of the cooling water passing through the inflow passage 21 and the first outflow passage 26 can be made smoother. It is possible to suppress the influence of the curve of the flow path and to reduce the pressure loss.

Further, the bent portion 27 and the first downstream passage 28 are positioned and connected at the downstream end of the first outflow passage 26 in the first outflow port 25 such that the first downstream direction LC is inclined by first downstream angle θ from the first outflow direction LA. Accordingly, the first downstream passage 28 extends parallel to the inflow passage 21. Thus, it is possible to smooth the flow of the cooling water flowing out of the first outflow port 25.

As described above, according to the three-way valve 1, in the first distribution mode, the pressure loss during the entire amount of the cooling water passing from the inflow port 20 to the first outflow port 25 can be reduced to a smaller value (e.g. 20 kPa) than the pressure loss during the entire amount of the cooling water passing from the inflow port 20 to the second outflow port 30 described later by configurations of the first outflow passage 26, the bent portion 27, and the first downstream passage 28 with respect to the inflow passage 21.

Next, the second distribution mode of the three-way valve 1 according to the first embodiment will be described. As shown in FIG. 5, in the second distribution mode, the cooling water is distributed such that the entire amount of the cooling water circulating in the cooling water circuit 50 passes through the second outflow port 30 and the ion exchanger 57. That is, in this case, the valve element 35 inside the valve chamber 13 is rotated so that the second outflow passage 31 is fully open and the first outflow passage 26 is fully closed.

The flow of the cooling water in the cooling water circuit 50 in the second distribution mode of the three-way valve 1 will be described. In the cooling water circuit 50, the cooling water in the cooling water flow path 52 is pumped by the cooling water pump 55, passes through a flow path in the external casing of the fuel cell 51, and absorbs heat of the fuel cell 51. The cooling water flowing out of the external casing of the fuel cell 51 flows into the valve chamber 13 from the cooling water flow path 52 through the inflow port 20 of the three-way valve 1.

Here, in the second distribution mode, since the valve element 35 fully closes the first outflow passage 26, the cooling water flows from the inside of the valve chamber 13 to the second outflow passage 31, the bent portion 32 and the second downstream passage 33, and then flows out to the bypass flow path 54.

The cooling water flowing into the bypass flow path 54 passes through the ion exchanger 57 and flows into the cooling water flow path 52 again. When the cooling water passes through the ion exchanger 57, ions in the cooling water are adsorbed by the ion exchange resin built in the ion exchanger 57 and removed from the cooling water.

Thereafter, the cooling water flowing into the cooling water flow path 52 is sucked in from a suction port of the cooling water pump 55 and pumped toward the fuel cell 51. As a result, the cooling water circulates in the cooling water circuit 50 in the second distribution mode such that the cooling water passes through the fuel cell 51, the three-way valve 1, the bypass flow path 54, and the ion exchanger 57. In the first embodiment, the flow path of the cooling water flowing in such state of the cooling water circuit 50 is referred to as a second flow path system.

That is, this second distribution mode is a distribution mode selected when the cooling water circuit 50 is operated in an appropriate state by removing ions in the cooling water. In the second distribution mode, the entire amount of cooling water passes through the bypass flow path 54 and the ion exchanger 57 and does not pass through the radiator 56.

Therefore, in the cooling water circuit 50 in the second distribution mode, the cooling water is not unnecessarily cooled, and it is possible to quickly warm the fuel cell 51 at the time of warm-up operation and overcooling of the fuel cell 51. That is, the second distribution mode can be regarded as a distribution mode selected at the time of warm-up operation and overcooling of the fuel cell 51.

Next, the pressure loss in the cooling water circuit 50 in the second distribution mode will be described with reference to FIG. 6. The pressure loss of the fuel cell 51 in the second distribution mode shows the same value (i.e. PA) as the pressure loss in the first distribution mode because the entire amount of the cooling water passes through the fuel cell 51. Also, the pressure loss of the pipe in the second distribution mode shows the same value (i.e. PB) as in the first distribution mode.

In the second distribution mode, the entire amount of the cooling water in the cooling water circuit 50 passes through the ion exchanger 57. Here, a water flow resistance of the ion exchanger 57 is smaller than that of the radiator 56 connected in parallel with the ion exchanger 57. Thus, a pressure loss of the ion exchanger 57 in the second distribution mode indicates a smaller value (e.g. 40 kPa) than that of the radiator 56.

In the three-way valve 1 of the second distribution mode, the cooling water flows into the inside of the valve chamber 13 from the inflow passage 21 of the inflow port 20, and then the entire amount of the cooling water passes through the second outflow passage 31, the bent portion 32, and the second downstream passage 33 of the second outflow port 30.

As shown in FIG. 4, the second outflow passage 31 of the second outflow port 30 extends so as to be at an acute angle to the inflow passage 21 of the inflow port 20. The curve from the inflow passage 21 to the second outflow passage 31 is sharper than the curve from the inflow passage 21 to the first outflow passage 26. That is, the second outflow direction LB is inclined from the reference direction L by the second angle β which is an acute angle larger than the first angle α.

Therefore, according to the three-way valve 1, the curve from the inflow passage 21 of the inflow port 20 toward the second outflow passage 31 of the second outflow port 30 can be kept as gentle as possible. Thus, the pressure loss at the time of flowing from the inflow channel 21 to the second outflow passage 31 can be reduced.

Further, the second outflow passage 31 of the second outflow port 30 are disposed so that the second angle β becomes the acute angle larger than the first angle α. Therefore, the pressure loss when flowing from the inflow passage 21 to the second outflow passage 31 can be set to a value (e.g. 30 kPa) larger than the pressure loss when flowing from the inflow passage 21 to the first outflow passage 26.

Here, the first outflow port 25 is connected to the radiator 56 having a large water passage resistance while the second outflow port 30 is connected to the ion exchanger 57 having a water passage resistance smaller than the radiator 56.

Therefore, as shown in FIG. 6, the pressure loss in the flow toward the second outflow port 30 is made to be larger than the pressure loss in the flow toward the first outflow port 25. Accordingly, a total pressure loss of the cooling water circuit 50 in the first distribution mode can be adjusted to become equal to a total pressure loss of the cooling water circuit 50 in the second distribution mode.

Further, the bent portion 32 and the second downstream passage 33 are positioned and connected at the downstream end of the second outflow passage 31 in the second outflow port 30 such that the second downstream direction LD is inclined by the second downstream angle φ from the second outflow direction LB. Accordingly, the second downstream passage 33 extends to be closer to the reference direction L of the inflow passage 21 than the second outflow passage 31 is to the reference direction L. Thus, it is possible to smooth the flow of the cooling water flowing out of the second outflow port 30.

As described above, according to the three-way valve 1, in the second distribution mode, the pressure loss during the entire amount of the cooling water passing from the inflow port 20 to the second outflow port 30 can be made larger than the pressure loss in the first distribution mode by configurations of the second outflow passage 31, the bent portion 32, and the second downstream passage 33 with respect to the inflow passage 21.

Next, the equal distribution mode of the three-way valve 1 according to the first embodiment will be described. As shown in FIG. 5, in the equal distribution mode, the cooling water is distributed such that a half amount of the cooling water circulating in the cooling water circuit 50 passes through the first outflow port 25 and the radiator 56, and the remaining half amount of the cooling water passes through the second outflow port 30 and the ion exchanger 57. That is, in this case, the valve element 35 inside the valve chamber 13 is rotated so that the flow rate of the cooling water flowing into the first outflow passage 26 and the flow rate of the cooling water flowing into the second outflow passage 31 become equal.

The flow of the cooling water in the cooling water circuit 50 in the equal distribution mode of the three-way valve 1 will be described. In the cooling water circuit 50, the cooling water in the cooling water flow path 52 is pumped by the cooling water pump 55, passes through a flow path in the external casing of the fuel cell 51, and absorbs heat of the fuel cell 51. The cooling water flowing out of the fuel cell 51 flows into the valve chamber 13 from the cooling water flow path 52 through the inflow port 20 of the three-way valve 1.

Here, in the equal distribution mode, the valve element 35 is rotated so that the cooling water flows into the first outflow passage 26 and the second outflow passage 31. Therefore, the half of the cooling water flowing into the valve chamber 13 from the inflow passage 21 (e.g. 100 L/min) flows into the first outflow passage 26, and the remaining half (e.g. 100 L/min) flows into the second outflow passage 31.

The cooling water flowing into the first outflow passage 26 passes through the bent portion 27 and the first downstream passage 28 and flows into the radiator-side flow path 53. The cooling water flowing into the radiator-side flow path 53 passes through the radiator 56 and flows into the cooling water flow path 52 again. Also in the equal distribution mode, when the cooling water passes through the radiator 56, the cooling water exchanges heat with an ambient atmosphere air around the radiator 56. Accordingly, the heat of the cooling water is radiated to the atmosphere air.

On the other hand, the cooling water flowing into the second outflow passage 31 passes through the bent portion 32 and the second downstream passage 33 and flows out to the bypass flow path 54. Then, the cooling water flowing into the bypass flow path 54 passes through the ion exchanger 57 and joins with the cooling water having passed through the radiator-side flow path 53 again in the cooling water flow path 52. Also in the equal distribution mode, when the cooling water passes through the ion exchanger 57, ions in the cooling water are adsorbed by the ion exchange resin of the ion exchanger 57 and removed from the cooling water.

Thereafter, the cooling water flowing into the cooling water flow path 52 is pumped by the cooling water pump 55 toward the fuel cell 51, and circulates in the cooling water circuit 50. That is, in the equal distribution mode according to the first embodiment, the cooling water circuit 50 uses the first flow path system and the second flow path system together.

That is, this equal distribution mode is one of the distribution modes selected when the cooling of the fuel cell 51 by the cooling water of the cooling water circuit 50 and the removal of ions contained in the cooling water of the cooling water circuit 50 are executed in parallel.

Figure 7:
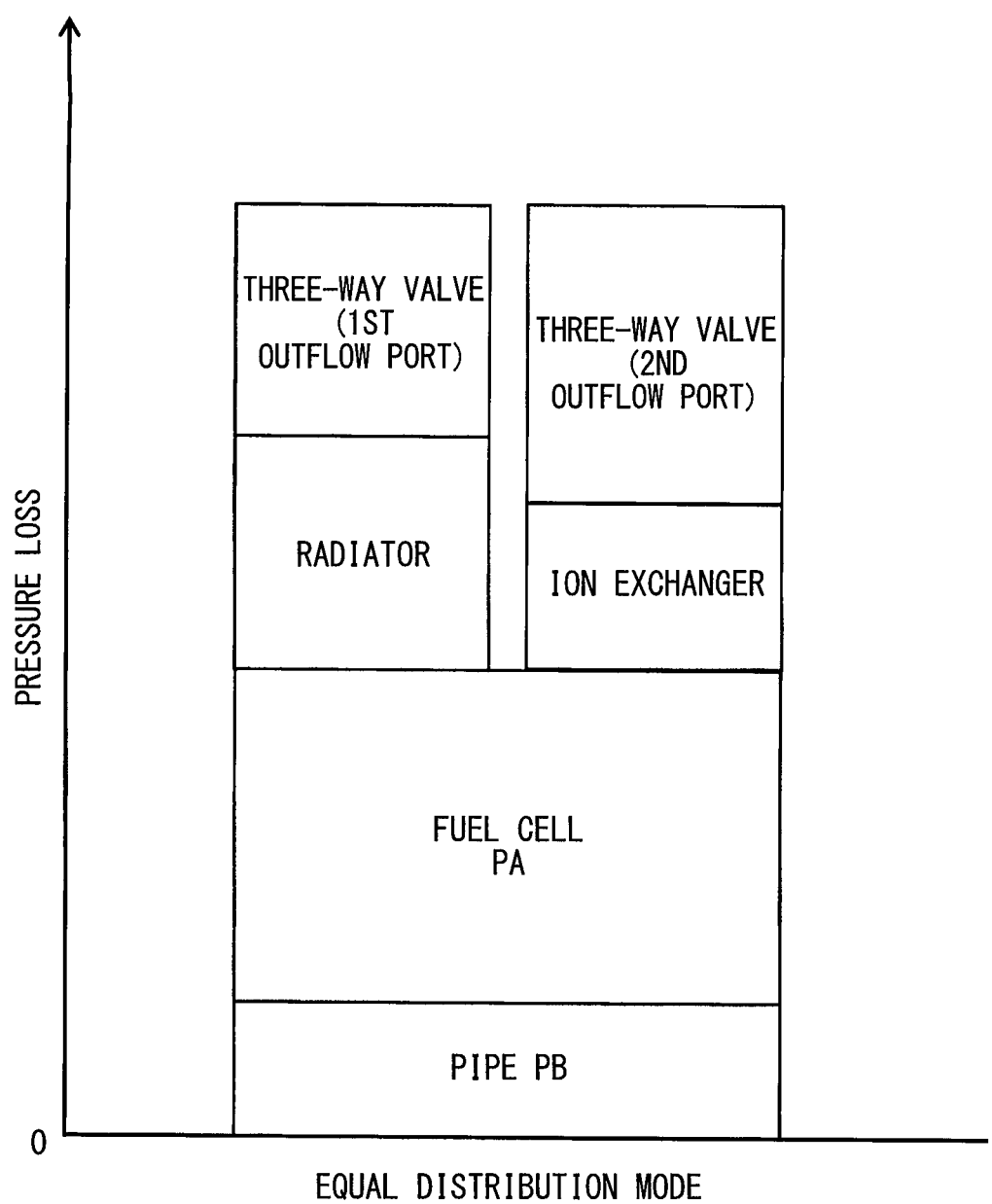
FIG. 7 is an explanatory diagram showing a pressure loss in an equal distribution mode in the cooling water circuit according to the first embodiment.

Next, the pressure loss in the cooling water circuit 50 in the equal distribution mode will be described with reference to FIG. 7. The pressure loss of the fuel cell 51 in the equal distribution mode is PA similar to the first distribution mode and the second distribution mode because the entire amount of the cooling water passes through the fuel cell 51 in the same manner as in the first distribution mode and the second distribution mode. Also, the pressure loss of the pipe in the equal distribution mode is PB which is the same value as in the first distribution mode and the second distribution mode.

In the three-way valve 1 of the equal distribution mode, the cooling water flows into the inside of the valve chamber 13 from the inflow passage 21 of the inflow port 20, and then the half amount of the cooling water passes through the first outflow passage 26 of the first outflow port 25, for example. The half amount of the cooling water in the cooling water circuit 50 flowing out of the first outflow port 25 passes through the radiator 56. That is, in the three-way valve 1 in the equal distribution mode, the flow of the cooling water distributed to the first outflow port 25 is the same as the above-described first distribution mode except for the flow rate of the cooling water.

On the other hand, the remaining half of the cooling water distributed by the three-way valve 1 in the equal distribution mode passes through, for example, the second outflow passage 31 of the second outflow port 30 from the valve chamber 13, and then passes through the ion exchanger 57. That is, in the three-way valve 1 in the equal distribution mode, the flow of the cooling water distributed to the second outflow port 30 is the same as the above-described second distribution mode except for the flow rate of the cooling water.

As shown in FIG. 4, the first outflow passage 26 extends such that the first outflow direction LA is inclined by the first angle α from the reference direction L of the inflow passage 21. The second outflow passage 31 extends such that the second outflow direction LB is inclined by the second angle β from the reference direction L of the inflow passage 21. Since the second angle β is larger than the first angle α, the curve of the cooling water flowing from the inflow port 20 to the second outflow passage 31 is sharper than the curve of the cooling water flowing from the inflow port 20 to the first outflow passage 26.

Therefore, according to the three-way valve 1, the pressure loss in the flow toward the second outflow passage 31 in the equal distribution mode can be made larger than the pressure loss in the flow toward the first outflow passage 26. Further, the first outflow port 25 is connected to the radiator 56 having a large water passage resistance while the second outflow port 30 is connected to the ion exchanger 57 having a small water passage resistance.

According to the three-way valve 1, it is possible to balance the pressure loss in a region from the first outflow passage 26 to the radiator 56 with the pressure loss in a region from the second outflow passage 31 to the ion exchanger 57, and it is possible to adjust these two pressure losses to become equal. According to the three-way valve 1, in the cooling water circuit 50, the pressure losses of the flow path systems in parallel relationship can be appropriately adjusted to be equal to each other according to the configuration of each flow path system.

As described above, according to the three-way valve 1 of the first embodiment, the cooling water flowing into the valve chamber 13 from the inflow passage 21 of the inflow port 20 can be distributed to the first outflow port 25 and the second outflow port 30. It is possible to adjust the flow rates of the cooling waters flowing out from the first outflow port 25 and the second outflow port 30 by moving the valve element 35 in the valve chamber 13.

As shown in FIG. 4, the first outflow passage 26, the bent portion 27, and the first downstream passage 28 are disposed in the first outflow port 25. The first downstream passage 28 is connected to a downstream side of the first outflow passage 26 by the bent portion 27. The first downstream passage 28 extends in a direction closer to the reference direction L than the first outflow direction LA is to the reference direction L.

This makes it possible to bring the flow direction of the cooling water flowing out from the first outflow port 25 closer to the flow direction of the cooling water passing through the inflow passage 21 of the inflow port 20. Thus, it is possible to reduce the water flow resistance at the first outflow port 25 and to smooth the flow of the cooling water. In the first outflow port 25, since the first downstream passage 28 is disposed substantially parallel to the inflow passage 21 of the inflow port 20, it is possible to further reduce the water flow resistance in the first outflow port 25.

Further, the second outflow passage 31, the bent portion 32, and the second downstream passage 33 are disposed in the second outflow port 30. The second downstream passage 33 is connected to a downstream of the second outflow passage 31 by the bent portion 32. The second downstream passage 33 extends in a direction closer to the reference direction L than the second outflow direction LB is to the reference direction L.

This makes it possible to bring the flow direction of the cooling water flowing out from the second outflow port 30 closer to the flow direction of the cooling water passing through the inflow passage 21 of the inflow port 20. Thus, it is possible to reduce the water flow resistance at the second outflow port 30 and to smooth the flow of the cooling water.

Further, the first downstream passage 28 is connected via the bent portion 27 in the first outflow port 25, and the second downstream passage 33 is connected via the bent portion 32 in the second outflow port 30. Thus, the three-way valve 1 according to the first embodiment can reduce a gap between the first downstream passage 28 and the second downstream passage 33, and can contribute to miniaturization of the three-way valve 1 itself.

By reducing the gap between the first downstream passage 28 and the second downstream passage 33, the distance between the pipe connected to the first outflow port 25 and the pipe connected to the second outflow port 30 can be reduced. Thus, the three-way valve 1 can also contribute to miniaturization of a space for disposing the cooling water circuit 50 which is a fluid circuit including the three-way valve 1.

In the first embodiment, the first outflow port 25 of the three-way valve 1 is connected to the radiator 56 having a large pressure loss via the radiator-side flow path 53, and the second outflow port 30 is connected to the ion exchanger 57 having a small pressure loss via the bypass flow path 54.

Further, the first outflow passage 26 of the first outflow port 25 extends such that the first outflow direction LA is inclined by the first angle α from the reference direction L. The second outflow passage 31 of the second outflow port 30 extends such that the second outflow direction LB is inclined by the second angle β from the reference direction L. Since the second angle β is the acute angle larger than the first angle α, the pressure loss when passing through the second outflow port 30 is larger than the pressure loss when passing through the first outflow port 25.

Thus, according to the three-way valve 1, a difference between the pressure loss in a case of passing through the radiator 56 via the first outflow port 25 and the pressure loss in a case of passing through the ion exchanger 57 via the second outflow port 30 can be reduced. And it is possible to properly adjust the balance of the pressure loss in the flow toward the first outflow port 25 and the pressure loss in the flow toward the second outflow port 30.

The downstream end part of the first outflow passage 26 in the flow of the cooling water is disposed so as to overlap the inflow passage 21 of the inflow port 20 with respect to the direction orthogonal to the flow direction of the cooling water passing through the first outflow port 25 from the inflow port 20 (i.e. the vertical direction in FIG. 4).

In other words, the part of the first outflow passage 26 of the first outflow port 25 corresponding to the overlapping width W is positioned on the extension line of the inflow passage 21 of the inflow port 20 which is extended through the valve chamber 13. Therefore, the part corresponding to the overlapping width W can be regarded as a straight flow path. Thus, the three-way valve 1 can smooth the flow of the cooling water passing from the inflow passage 21 of the inflow port 20 to the first outflow passage 26 of the first outflow port 25.

Second Embodiment

A second embodiment different from the above-described first embodiment will be described with reference to the drawings. Similar to the first embodiment, a three-way valve 1 according to the second embodiment constitutes a part of a cooling water circuit 50 that is used for cooling a fuel cell 51 of an electric vehicle (fuel cell vehicle).

The three-way valve 1 according to the second embodiment has, similar to the first embodiment, a configuration where an inflow port 20, a first outflow port 25, and a second outflow port 30 are each connected to a valve chamber 13 formed in a body 10. The three-way valve 1 moves the valve element 35 inside the valve chamber 13, thereby being capable of adjusting a flow rate distribution of the cooling water flowing from the inflow port 20 toward the first outflow port 25 and the second outflow port 30.

The basic configuration of the three-way valve 1 according to the second embodiment is the same as that of the first embodiment, except for specific configurations of the first outflow port 25 and the second outflow port 30. Accordingly, regarding the basic configuration of the three-way valve 1, the connection modes of the three-way valve 1 in the cooling water circuit 50, etc., the explanations thereof in the first embodiment are referred. The specific configurations of the first outflow port 25 and the second outflow port 30 according to the second embodiment will be described.

In the following description, the same reference numerals as those in the first embodiment denote the same configurations unless there is a specific explanation.

Figure 8:
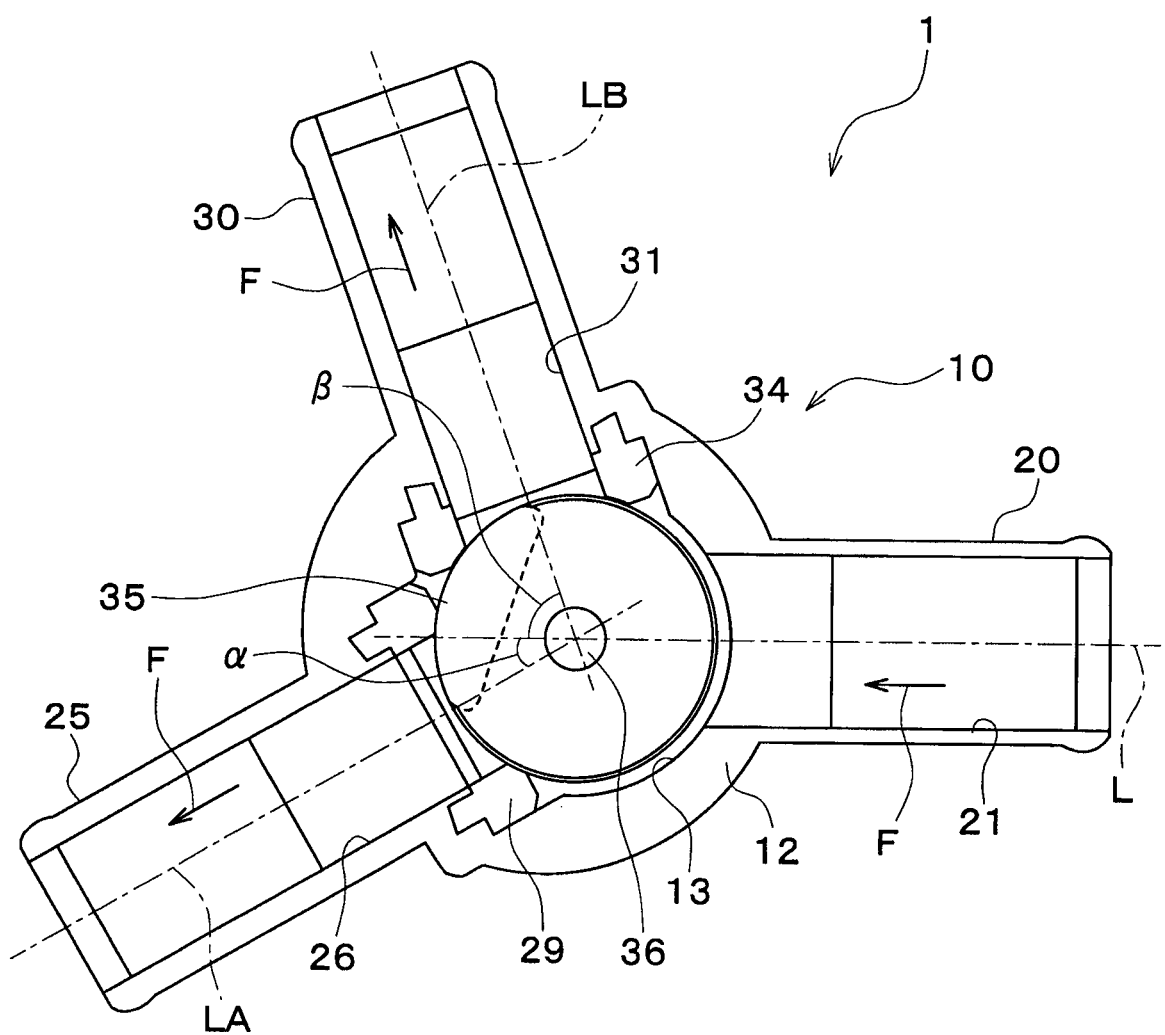
FIG. 8 is a cross-sectional view showing an internal configuration of the three-way valve according to a second embodiment.

As shown in FIG. 8, the three-way valve 1 according to the second embodiment has the configuration where the inflow port 20, the first outflow port 25, and the second outflow port 30 are connected to the valve chamber 13 formed in the body 10.

The inflow port 20 according to the second embodiment, similar to the first embodiment, is formed in a circular tube shape connecting an inside of the valve chamber 13 of the three-way valve 1 and the cooling water circuit 50. The inflow port 20 extends linearly in a predetermined direction (i.e. reference direction L). An inflow passage 21 is formed inside the inflow port 20, and the inflow passage 21 introduces the cooling water flowing through a cooling water flow path 52 of the cooling water circuit 50 into the inside of the valve chamber 13.

The first outflow port 25 according the second embodiment extends in a direction opposite to the direction in which the inflow port 20 extends with respect to the valve chamber 13. The first outflow port 25 is formed in a circular tube shape connecting the inside of the valve chamber 13 of the three-way valve 1 and a radiator-side flow path 53 of the cooling water circuit 50. The first outflow port 25 includes therein a first outflow passage 26. The first outflow port 25 causes the cooling water flowing out of the valve chamber 13 to flow toward the radiator 56 through the radiator-side flow path 53.

As shown in FIG. 8, unlike the first embodiment, the bent portion 27 and the first downstream passage 28 are not formed in the first outflow port 25 according to the second embodiment. The first outflow passage 26 extends linearly in a direction (i.e. first outflow direction LA) different from the reference direction L of the inflow port 20. Also in the second embodiment, the first outflow direction LA intersects the reference direction L at an acute angle (i.e. first angle $\alpha$) on the side opposite to the direction in which the inflow port 20 extends. The first outflow direction LA is tilted by the first angle $\alpha$ from the reference direction L.

A first seal member 29 made of rubber is arranged on an end portion of the first outflow passage 26 facing the valve chamber 13 according to the second embodiment. The first seal member 29 is configured to be capable of being brought into contact with an outer circumferential surface of the valve element 35 disposed in the valve chamber 13.

The second outflow port 30 according to the second embodiment, similar to the first embodiment, extends in a direction opposite to the direction in which the inflow port 20 extends with respect to the valve chamber 13. The extending direction of the second outflow port 30 is different from that of the first outflow port 25. The second outflow port 30 is formed in a circular tube shape connecting the inside of the valve chamber 13 of the three-way valve 1 and the bypass flow path 54 the cooling water circuit 50. The second outflow port 30 includes therein a second outflow passage 31. The second outflow port 30 causes the cooling water flowing out of the valve chamber 13 to flow toward the ion exchanger 57 through the bypass flow path 54.

As shown in FIG. 8, unlike the first embodiment, the bent portion 32 and the second downstream passage 33 are not formed in the second outflow port 30 according to the second embodiment. The second outflow passage 31 extends linearly in a direction (i.e. second outflow direction LB) different from the reference direction L of the inflow port 20 and the first outflow direction LA of the first outflow port 25.

Also in the second embodiment, the second outflow direction LB intersects the reference direction L at an acute angle (i.e. second angle $\beta$) larger than the first angle $\alpha$ on the side opposite to the direction in which the inflow port 20 extends. The second outflow direction LB is inclined by the second angle $\beta$ from the reference direction L.

A second seal member 34 made of rubber is arranged on an end portion of the second outflow passage 31 facing the valve chamber 13 according to the second embodiment. The second seal member 34 is configured to be capable of being brought into contact with an outer circumferential surface of the valve element 35 disposed in the valve chamber 13.

With such a configuration, also in the three-way valve 1 according to the second embodiment, the first angle $\alpha$ of the first outflow port 25 is set to the acute angle smaller than the second angle $\beta$ of the second outflow port 30. The pressure loss in the flow toward the first outflow port 25 can be made smaller than the pressure loss in the flow toward the second outflow port 30.

The first outflow port 25 of the three-way valve 1 is connected to the radiator 56 having a large pressure loss via the radiator-side flow path 53, and the second outflow port 30 is connected to the ion exchanger 57 having a small pressure loss via the bypass flow path 54.

Thus, also in the three-way valve 1 according to the second embodiment, a difference between the pressure loss in a case of passing through the radiator 56 via the first outflow port 25 and the pressure loss in a case of passing through the ion exchanger 57 via the second outflow port 30 can be reduced. Thus, the three-way valve 1 according to the second embodiment can properly adjust the balance of the pressure loss in the flow toward the first outflow port 25 and the pressure loss in the flow toward the second outflow port 30.

As described above, according to the three-way valve 1 of the second embodiment, the cooling water flowing into the valve chamber 13 from the inflow passage 21 of the inflow port 20 can be distributed to the first outflow port 25 and the second outflow port 30. It is possible to adjust the flow rates of the cooling waters flowing out from the first outflow port 25 and the second outflow port 30 by moving the valve element 35 in the valve chamber 13.

Also in the second embodiment, the pressure loss of the radiator 56 connected to the first outflow port 25 is larger than the pressure loss of the ion exchanger 57 connected to the second outflow port 30. Since the first angle $\alpha$ of the first outflow port 25 is smaller than the second angle $\beta$ of the second outflow port 30, the pressure loss in the flow toward the first outflow port 25 is smaller than the pressure loss in the flow toward the second outflow port 30 in the three-way valve 1.

Therefore, the three-way valve 1 according to the second embodiment makes the pressure losses in the three-way valve 1 itself toward the first outflow port 25 and toward the second outflow port 30 to be different. Thus, it is possible to balance the pressure loss in a flow path system toward the radiator 56 through the first outflow port 25 and the pressure loss in a flow path system toward the ion exchanger 57 through the second outflow port 30. Since both the first angle α and the second angle β are acute angles, the three-way valve 1 can reduce the pressure losses in the three-way valve 1 itself toward the first outflow port 25 and toward the second outflow port 30.

Further, the sizes of the outflow passages (e.g. the first outflow passage 26 and the second outflow passage 31) in the first outflow port 25 and the second outflow port 30 are determined by the configurations of the flow path systems connected downstream thereof (e.g. the pressure losses of the radiator 56 and the ion exchanger 57), the required capacities thereof, and the like. Therefore, a balance between the pressure loss of the three-way valve 1 itself and the pressure loss of the flow path system connected to each outflow port may cause necessity of an increase in size of the outflow passages connected to the output ports, and may result in an increase in size of the three-way valve 1 itself.

On this point, according to the three-way valve 1 of the present embodiment, the magnitude relationship between the first angle α and the second angle β can balance the pressure loss in a flow path system toward the radiator 56 through the first outflow port 25 and the pressure loss in a flow path system toward the ion exchanger 57 through the second outflow port 30. As a result, the three-way valve 1 can reduce the sizes of the outflow passages in the three-way valve 1 and the cooling water circuit 50, and can reduce the size of the three-way valve 1 itself.

Third Embodiment

A third embodiment different from each of the above-described embodiments will be described with reference to FIGS. 9 and 10. Similar to the above-described embodiments, a three-way valve 1 according to the third embodiment constitutes a part of a cooling water circuit 50 that is used for cooling a fuel cell 51 of an electric vehicle (fuel cell vehicle).

In the first embodiment and the second embodiment, the three-way valve 1 is disposed to distribute the cooling water in the cooling water circuit 50, but in the third embodiment, the three-way valve 1 is used for combining the two flows of the cooling water in the cooling water circuit 50. In FIG. 10, flows of the cooling water in the three-way valve 1 according to the third embodiment are indicated by arrows F.

The three-way valve 1 according to the third embodiment has, similar to the above-described embodiments, a configuration where an outflow port 20A, a first inflow port 25A, and a second inflow port 30A are each connected to a valve chamber 13 formed in a body 10. The three-way valve 1 moves the valve element 35 inside the valve chamber 13, thereby being capable of adjusting a ratio of flow rates of the cooling water flowing from the first inflow port 25A and the second inflow port 30A and adjusting a flow rate of the cooling water flowing out of the outflow port 20A.

Next, a configuration of the cooling water circuit 50, in which the three-way valve 1 according to the third embodiment is disposed, will be described with reference to FIG. 9. The cooling water circuit 50 according to the third embodiment is, similar to the above-described embodiments, configured to circulate the cooling water as a heat medium to a fuel cell 51, a cooling water pump 55, a radiator 56 as a cooling device, and an ion exchanger 57. The configurations of the fuel cell 51, the radiator 56, and the ion exchanger 57 are similar to those of the above-described embodiments.

The flow path of the cooling water in the cooling water circuit 50 includes a cooling water flow path 52, a radiator-side flow path 53, and a bypass flow path 54. The fuel cell 51 and the cooling water pump 55 are connected to the cooling water flow path 52. The radiator 56 is disposed on the radiator-side flow path 53, and the ion exchanger 57 is disposed on the bypass flow path 54. That is, the cooling water circuit 50 has a circulation flow path in which the radiator 56 and the ion exchanger 57 are connected in parallel and the cooling water is circulated thereto.

Figure 9:
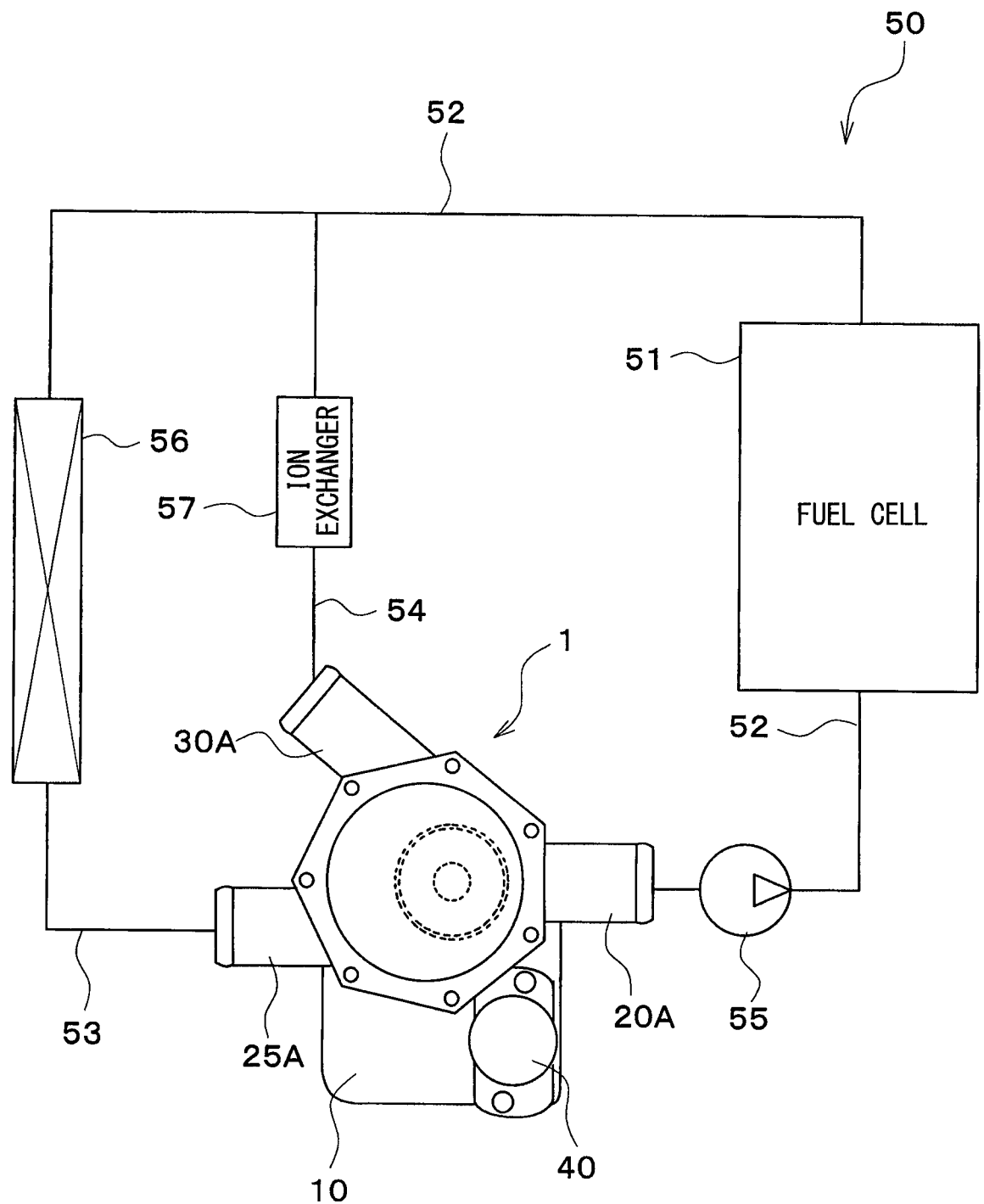
FIG. 9 is a circuit configuration diagram showing a cooling water circuit including the three-way valve according to a third embodiment.

As shown in FIG. 9, in the cooling water circuit 50 of the third embodiment, one end side of the radiator-side flow path 53 is connected to the first inflow port 25A of the three-way valve 1, and one end side of the bypass flow path 54 is connected to the second inflow port 30A of the three-way valve 1. One end side of the cooling water flow path 52 is connected to the outflow port 20A of the three-way valve 1.

The three-way valve 1 according to the third embodiment is disposed at a meeting point of flows of the cooling water in the cooling water circuit 50. Another end side of the cooling water flow path 52 is connected to another end side of the radiator-side flow path 53 and another end side of the bypass flow path 54, thereby constituting a branch point of the flow of the cooling water in the cooling water circuit 50.

In the cooling water circuit 50 according to the third embodiment, the cooling water pump 55 is disposed in the cooling water flow path 52 connecting the outflow port 20A of the three-way valve 1 and the fuel cell 51. The cooling water pump 55 pumps and circulates the cooling water in the cooling water circuit 50 to the fuel cell 51.

Therefore, after passing through the fuel cell 51, the cooling water in the cooling water circuit 50 branches off from the cooling water flow path 52 to the radiator-side flow path 53 and the bypass flow path 54. The cooling water flowing into the radiator-side flow path 53 passes through the radiator 56 and flows into the first inflow port 25A of the three-way valve 1.

On the other hand, the cooling water flowing into the bypass flow path 54 passes through the ion exchanger 57 and flows into the second inflow port 30A of the three-way valve 1. That is, in the cooling water circuit 50 according to the third embodiment, the flow of the cooling water from the radiator-side flow path 53 and the flow of the cooling water from the bypass flow path 54 are joined together in the three-way valve 1.

Next, a specific configuration of the three-way valve 1 according to the third embodiment will be described in detail with reference to FIG. 10. As described above, the three-way valve 1 according to the third embodiment is disposed at the meeting point where the radiator-side flow path 53 and the bypass flow path 54 merge into the cooling water flow path 52.

The three-way valve 1 according to the third embodiment is configured similarly to the above-described embodiments except for the configurations of the outflow port 20A, the first inflow port 25A and the second inflow port 30A. Therefore, in the three-way valve 1 according to the third embodiment, the configurations of the body 10, the valve element 35, the electric motor 40, the gear mechanism portion 41, and the like are the same as those in the above-described embodiments, and descriptions thereof will be omitted.

Figure 10:
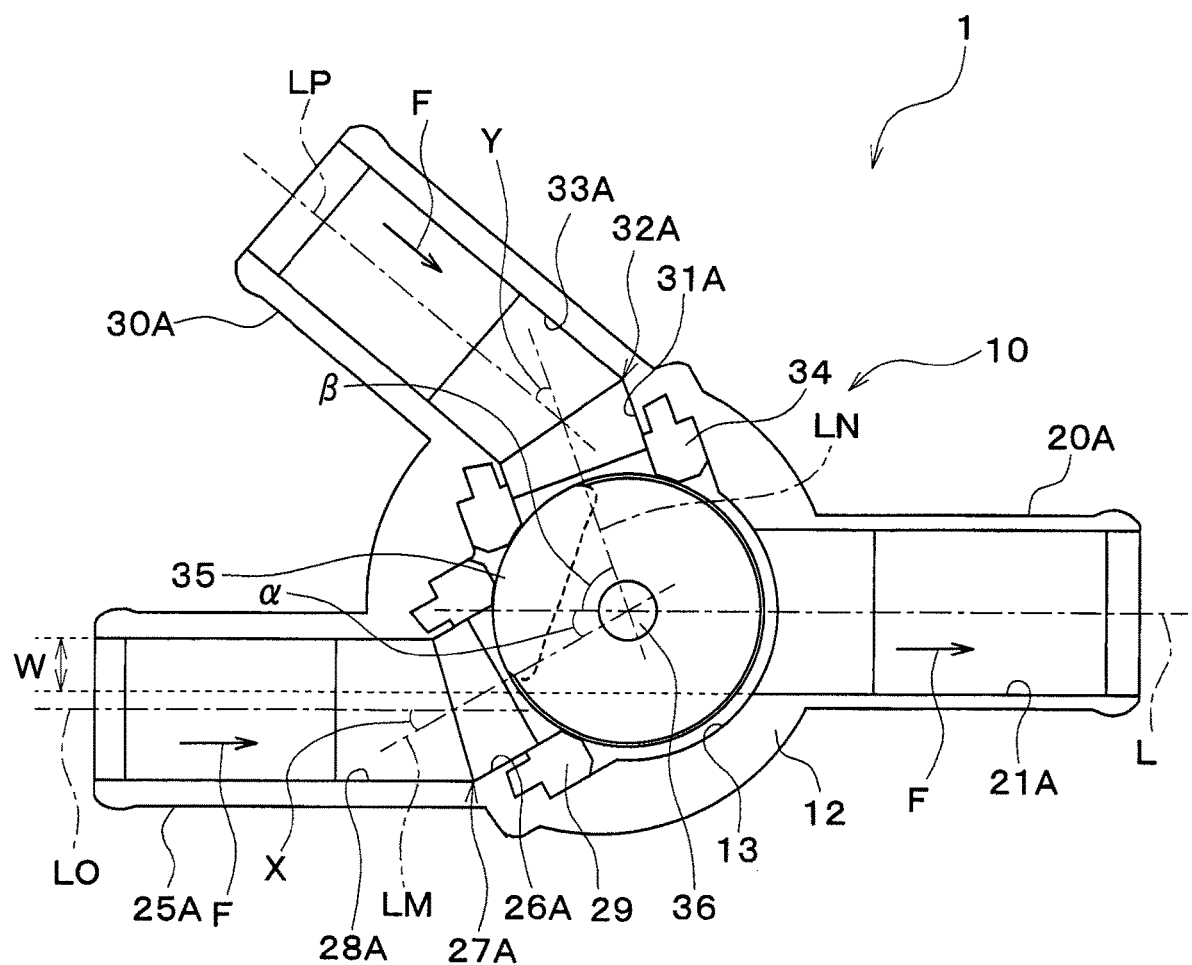
FIG. 10 is a cross-sectional view showing an internal configuration of the three-way valve according to a third embodiment.

As shown in FIG. 10, the three-way valve 1 according to the third embodiment has the outflow port 20A connected to the valve chamber 13 of the body 10. The outflow port 20A is formed in a circular tube shape connecting an inside of the valve chamber 13 and the cooling water circuit 50. The outflow port 20A extends linearly in a predetermined direction.

An inside of the outflow port 20A having a circular tube shape forms an outflow passage 21A and guides the cooling water flowing out of the valve chamber 13 to the cooling water flow path 52 of the cooling water circuit 50. The outflow port 20A functions as an outflow port, and the outflow passage 21A functions as an outflow passage formed in the outflow port.

In the third embodiment, as shown in FIG. 10, a direction in which the central axis of the outflow passage 21A in the outflow port 20A extends is referred to as a reference direction L. The reference direction L corresponds to a reference direction in which the above-described outflow passage extends.

In the three-way valve 1 according to the third embodiment, the first inflow port 25A extends in a direction opposite to the direction in which the outflow port 20A extends with respect to the valve chamber 13. The first inflow port 25A is formed in a circular tube shape connecting the inside of the valve chamber 13 of the three-way valve 1 and the cooling water circuit 50. The first inflow port 25A includes therein a first inflow passage 26A, a bent portion 27A, and a first upstream passage 28A. The first inflow port 25A guides the cooling water flowing out of the radiator-side flow path 53 of the cooling water circuit 50 to the inside of the valve chamber 13.

The first inflow passage 26A is a flow passage in the first inflow port 25A, through which the cooling water passes when flowing into the valve chamber 13. The first inflow passage 26A linearly extends in a direction different from the reference direction L of the outflow port 20A. As shown in FIG. 10, the extending direction of the central axis of the first inflow passage 26A in the first inflow port 25A is a first inflow direction LM.

The first inflow direction LM intersects the reference direction L at an acute angle on the side opposite to the direction in which the outflow port 20A extends. The first inflow direction LM is tilted by the acute angle from the reference direction L. In the third embodiment, the angle between the reference direction L and the first inflow direction LM on the side opposite to the outflow port 20A is referred to as a first angle α.

A first seal member 29 made of rubber is disposed at an end portion of the first inflow passage 26A facing the valve chamber 13. Therefore, the three-way valve 1 is capable of shutting off the cooling water flowing from the first inflow passage 26A toward the valve chamber 13 by changing the position of the valve element 35 in the valve chamber 13 and bringing an entire periphery of an end of the first seal member 29 into contact with the outer circumferential surface of the valve element 35.

As shown in FIG. 10, an upstream end part of the first inflow passage 26A in the flow of the cooling water is disposed so as to overlap the outflow passage 21A of the outflow port 20A with respect to a direction orthogonal to a flow direction of the cooling water passing through the first inflow port 25A toward the outflow port 20A (i.e. the vertical direction in FIG. 10).

In other words, the part of the first inflow passage 26A of the first inflow port 25A corresponding to the overlapping width W is positioned on the extension line of the outflow passage 21A of the outflow port 20A which is extended through the valve chamber 13. Therefore, the three-way valve 1 can smooth the flow of the cooling water passing from the first inflow passage 26A of the first inflow port 25A to the outflow passage 21A of the outflow port 20A.

The bent portion 27A and the first upstream passage 28A are disposed upstream of the first inflow passage 26A of the first inflow port 25A in flow of the cooling water. The first upstream passage 28A is a cylindrical flow passage located upstream of the first inflow passage 26A in flow of the cooling water. The first upstream passage 28A extends linearly from an upstream end portion of the first inflow passage 26A. As shown in FIG. 10, the extending direction of the central axis of the first upstream passage 28A in the first inflow port 25A is a first upstream direction LO.

The first upstream passage 28A guides the cooling water flowing thereinto from an outside of the first inflow port 25A (i.e. the radiator-side flow path 53 in the cooling water circuit 50) to the first inflow passage 26A. The first upstream passage 28A corresponds to an upstream passage of the first inflow port.

The bent portion 27A is disposed at the upstream end portion of the first inflow passage 26A in flow of the cooling water. The bent portion 27A connects the first inflow passage 26A and the first upstream passage 28A such that the first upstream passage 28A is inclined from the first inflow passage 26A. The bent portion 27A connects the first inflow passage 26A and the first upstream passage 28A such that the first upstream direction LO of the first upstream passage 28A is closer to the reference direction L of the outflow passage 21A than the first inflow direction LM of the first inflow passage 26A is to the reference direction L.

As shown in FIG. 10, the bent portion 27A connects the first upstream passage 28A to the first inflow passage 26A such that the first inflow direction LM of the first inflow passage 26A crosses at an acute angle the first upstream direction LO of the first upstream passage 28A. In the third embodiment, the angle formed between the first inflow direction LM and the first upstream direction LO is referred to as a first upstream angle X.

In the third embodiment, the bent portion 27A connects the first inflow passage 26A and the first upstream passage 28A so that the first upstream angle X becomes the same value as the first angle α. As a result, the first upstream direction LO of the first upstream passage 28A is parallel to the reference direction L of the outflow passage 21A of the outflow port 20A. That is, the first upstream passage 28A extends parallel to the outflow passage 21A.

In the three-way valve 1 according to the third embodiment, the second inflow port 30A extends in a direction different from the extending direction of the first inflow port 25A and opposite to the extending direction of the outflow port 20A with respect to the valve chamber 13. The second inflow port 30A is formed in a circular tube shape connecting the valve chamber 13 of the three-way valve 1 and the cooling water circuit 50. The second inflow port 30A includes therein a second inflow passage 31A, a bent portion 32A, and a second upstream passage 33A. The second inflow port 30A guides the cooling water flowing out of the bypass flow path 54 of the cooling water circuit 50 to the inside of the valve chamber 13.

The second inflow passage 31A is a flow passage in second inflow port 30A, through which the cooling water passes when flowing into the valve chamber 13. The second inflow passage 31A linearly extends in a direction different from the reference direction L of the outflow port 20A and first inflow direction LM of the first inflow port 25A. As shown in FIG. 10, the extending direction of the central axis of the second inflow passage 31A in the second inflow port 30A is a second inflow direction LN.

The second inflow direction LN intersects the reference direction L at an acute angle on the side opposite to the direction in which the outflow port 20A extends. The second inflow direction LN is tilted by the acute angle from the reference direction L. In the third embodiment, the angle between the reference direction L and the second inflow direction LN on the side opposite to the outflow port 20A is referred to as a second angle β. The second angle β is larger than the first angle α of the first inflow port 25A.

A second seal member 34 made of rubber is disposed at an end portion of the second inflow passage 31A facing the valve chamber 13. Therefore, the three-way valve 1 is capable of shutting off the cooling water flowing from the second inflow passage 31A toward the valve chamber 13 by changing the position of the valve element 35 in the valve chamber 13 and bringing an entire periphery of an end of the second seal member 34 into contact with the outer circumferential surface of the valve element 35.

The bent portion 32A and the second upstream passage 33A are disposed upstream of the second inflow passage 31A of the second inflow port 30A in flow of the cooling water. The second upstream passage 33A is a cylindrical flow passage located upstream of the second inflow passage 31A in flow of the cooling water. The second upstream passage 33A extends linearly from an upstream end portion of the second inflow passage 31A. As shown in FIG. 10, the extending direction of the central axis of the second upstream passage 33A in the second inflow port 30A is a second upstream direction LP.

The second upstream passage 33A guides the cooling water flowing thereinto from an outside of the second inflow port 30A (i.e. the bypass flow path 54 in the cooling water circuit 50) to the second inflow passage 31A. The second upstream passage 33A corresponds to an upstream passage of the second inflow port.

The bent portion 32A is disposed at the upstream end portion of the second inflow passage 31A in flow of the cooling water. bent portion 32A connects the second inflow passage 31A and the second upstream passage 33A such that the second upstream passage 33A is inclined from the second inflow passage 31A. The bent portion 32A connects the second inflow passage 31A and the second upstream passage 33A such that the second upstream direction LP of the second upstream passage 33A is closer to the reference direction L of the outflow passage 21A than the second inflow direction LN of the second inflow passage 31A is to the reference direction L.

As shown in FIG. 10, the bent portion 32A connects the second upstream passage 33A to the second inflow passage 31A such that the second inflow direction LN of the second inflow passage 31A crosses at an acute angle the second upstream direction LP of the second upstream passage 33A. In the third embodiment, the angle formed between the second inflow direction LN and the second upstream direction LP is referred to as a second upstream angle Y.

As a result, the second upstream passage 33A extends so as to be closer to the first inflow port 25A than an extension line of the second inflow passage 31A (i.e. the second inflow direction LN). Therefore, the three-way valve 1 can contribute to downsizing of itself. Further, since it is possible to arrange flow paths with a small interval therebetween on downstream sides of the first inflow port 25A and the second inflow port 30A (i.e. the radiator-side flow path 53 and the bypass flow path 54). The arrangement space of the cooling water circuit 50 can be reduced.

With such a configuration, according to the three-way valve 1 of the third embodiment, the cooling water flowing in thereinto from the first inflow port 25A and the cooling water flowing in thereinto from the second inflow port 30A can be joined together. It is possible to adjust a ratio of the flow rates of the cooling waters flowing from the first inflow port 25A and the second inflow port 30A by moving the valve element 35 in the valve chamber 13.

As shown in FIG. 10, the first inflow passage 26A, the bent portion 27A, and the first upstream passage 28A are disposed in the first inflow port 25A. The first upstream passage 28A is connected to an upstream side of the first inflow passage 26A by the bent portion 27A. The first upstream passage 28A extends in a direction closer to the reference direction L than the first inflow direction LM is to the reference direction L.

This makes it possible to bring the flow direction of the cooling water flowing into the first inflow port 25A closer to the flow direction of the cooling water passing through the outflow passage 21A of the outflow port 20A. Thus, it is possible to reduce the water flow resistance at the first inflow port 25A and to smooth the flow of the cooling water. In the first inflow port 25A, since the first upstream passage 28A is disposed substantially parallel to the outflow passage 21A of the outflow port 20A, it is possible to further reduce the water flow resistance in the first inflow port 25A.

Further, the second inflow passage 31A, the bent portion 32A, and the second upstream passage 33A are disposed in the second inflow port 30A. The second upstream passage 33A is connected to an upstream side of the second inflow passage 31A by the bent portion 32A. The second upstream passage 33A extends in a direction closer to the reference direction L than the second inflow direction LN is to the reference direction L.

This makes it possible to bring the flow direction of the cooling water flowing into the second inflow port 30A closer to the flow direction of the cooling water passing through the outflow passage 21A of the outflow port 20A. Thus, it is possible to reduce the water flow resistance at the second inflow port 30A and to smooth the flow of the cooling water.

Further, the first upstream passage 28A is connected via the bent portion 27A in the first inflow port 25A, and the second upstream passage 33A is connected via the bent portion 32A in the second inflow port 30A. Thus, the three-way valve 1 according to the third embodiment can reduce a gap between the first upstream passage 28A and the second upstream passage 33A, and can contribute to miniaturization of the three-way valve 1 itself.

By reducing the gap between the first upstream passage 28A and the second upstream passage 33A, the distance between the pipe connected to the first inflow port 25A and the pipe connected to the second inflow port 30A can be reduced. Thus, the three-way valve 1 according to the third embodiment can also contribute to miniaturization of a space for disposing the cooling water circuit 50 including the three-way valve 1.

In the third embodiment, the first inflow port 25A of the three-way valve 1 is connected to the radiator 56 having a large pressure loss via the radiator-side flow path 53, and the second inflow port 30A is connected to the ion exchanger 57 having a small pressure loss via the bypass flow path 54.

Further, the first inflow passage 26A of the first inflow port 25A extends such that the first inflow direction LM is inclined by the first angle α from the reference direction L. The second inflow passage 31A of the second inflow port 30A extends such that the second inflow direction LN is inclined by the second angle β from the reference direction L. Since the second angle β is the acute angle larger than the first angle α, the pressure loss when passing through the second inflow port 30A is larger than the pressure loss when passing through the first inflow port 25A.

Thus, in the three-way valve 1 according to the third embodiment, a difference between the pressure loss in a case of passing through the radiator 56 via the first inflow port 25A and the pressure loss in a case of passing through the ion exchanger 57 via the second inflow port 30A can be reduced. And it is possible to properly adjust the balance of the pressure loss in the flow toward the first inflow port 25A and the pressure loss in the flow toward the second inflow port 30A.

Further, the upstream end part of the first inflow passage 26A in the flow of the cooling water is disposed so as to overlap the outflow passage 21A of the outflow port 20A with respect to a direction orthogonal to a flow direction of the cooling water passing through the first inflow port 25A from the outflow port 20A (i.e. the vertical direction in FIG. 10).

In other words, the part of the first inflow passage 26A of the first inflow port 25A corresponding to the overlapping width W is positioned on the extension line of the outflow passage 21A of the outflow port 20A which is extended through the valve chamber 13. Therefore, the part corresponding to the overlapping width W can be regarded as a straight flow path. Thus, the three-way valve 1 can smooth the flow of the cooling water passing from the first inflow passage 26A of the first inflow port 25A to the outflow passage 21A of the outflow port 20A.

As described above, according to the three-way valve 1 of the third embodiment, the cooling waters flowing from the first inflow passage 26A of the first inflow port 25A and the second inflow passage 31A of the second inflow port 30A can be joined together in the valve chamber 13, and then flows out from the outflow passage 21A of the outflow port 20A. The three-way valve 1 moves the valve element 35 inside the valve chamber 13, thereby being capable of adjusting a ratio of flow rates of the cooling waters flowing from the first inflow port 25A and the second inflow port 30A.

The first inflow passage 26A, the bent portion 27A, and the first upstream passage 28A are disposed in the first inflow port 25A. The first upstream passage 28A is connected to an upstream side of the first inflow passage 26A by the bent portion 27A. The first upstream passage 28A extends in a direction closer to the reference direction L than the first inflow direction LM is to the reference direction L.

Therefore, the three-way valve 1 according to the third embodiment can make the flow of the cooling water flowing thereinto from the first inflow port 25A closer to the flow of the cooling water flowing out from the outflow passage 21A of the outflow port 20A. That is, the three-way valve 1 can reduce the water flow resistance at the first inflow port 25A, and can smooth the flow of the cooling water.

Further, the second inflow passage 31A, the bent portion 32A, and the second upstream passage 33A are disposed in the second inflow port 30A. The second upstream passage 33A is connected to an upstream side of the second inflow passage 31A by the bent portion 32A. The second upstream passage 33A extends in a direction closer to the reference direction L than the second inflow direction LN is to the reference direction L.

Accordingly, the three-way valve 1 can make the flow of the cooling water flowing thereinto from the second inflow port 30A closer to the flow of the cooling water flowing out from the outflow passage 21A of the outflow port 20A. That is, the three-way valve 1 reduces the water flow resistance at the second inflow port 30A, and thereby smooths the flow of the cooling water.

Further, the first upstream passage 28A is connected to the first inflow passage 26A via the bent portion 27A in the first inflow port 25A, and the second upstream passage 33A is connected to the second inflow passage 31A via the bent portion 32A in the second inflow port 30A. Thus, the three-way valve 1 can reduce a gap between the first upstream passage 28A and the second upstream passage 33A, and can contribute to miniaturization of the three-way valve 1 itself.

Since the three-way valve 1 reduces the gap between the first upstream passage 28A and the second upstream passage 33A, the distance between the pipe connected to the first inflow port 25A and the pipe connected to the second inflow port 30A can be reduced. Thus, the three-way valve 1 according to the third embodiment can also contribute to miniaturization of a space for disposing a fluid circuit including the three-way valve 1.

Other Embodiments

The present disclosure has been described above based on the embodiments, but the present disclosure is not limited to the above-described embodiments. That is, various improvements and modifications can be made without departing from the scope of the present disclosure. For example, each of the above-described embodiments may be arbitrarily combined, or various modifications of the above-described embodiments are possible.

(1) In the above-described embodiments, a flow path system including the radiator 56 connected to the radiator-side flow path 53 is given as the first flow path system, and a flow path system including the ion exchanger 57 connected to the bypass flow path 54 is given as the second flow path system, but the present disclosure is not limited to these embodiments. The first flow path system and the second flow path system can adopt various circuit configurations as long as the circuit configuration connected to the three-way valve 1 has different paths and configurations.

(2) When there is a difference in pressure loss between the first flow path system and the second flow path system, the first angle α and the second angle β may be set different. If the first flow path system (i.e. a system including the radiator 56) is larger than the second flow path system (i.e. a system including the ion exchanger 57) in pressure loss, various circuit configurations can be adopted.

For example, in the above-described embodiments, the second flow path system connected to the second outflow port 30 includes the ion exchanger 57 connected to the bypass flow path 54, but the present disclosure is not limited to this embodiment. Alternatively, the ion exchanger 57 may be removed and the bypass flow path 54 may be used. Further, instead of the radiator 56 and the ion exchanger 57 in the above-described embodiments, it is also possible to change to another component device through which the cooling water passes.

(3) In the above-described embodiment, the cooling water for cooling the fuel cell 51 is used as the fluid, but the present disclosure is not limited to this mode. Various fluids can be adopted as long as the fluid can be supplied to different flow path systems by the three-way valve 1 and the distribution flow rate can be adjusted, and ATF or the like can also be adopted.

(4) In the above-described first embodiment, the inflow passage 21 and the first downstream passage 28 are configured to extend in parallel by setting the first angle α and the first downstream angle θ to be equal to each other. However, it is not limited to this embodiment. The first downstream angle θ may be equal to the first angle α, but they do not necessarily need to coincide with each other, and can be appropriately changed in response to a request for a circuit configuration or the like. Similarly, it is also possible to make the inflow passage 21 and the second downstream passage 33 parallel by making the second angle β equal to the second downstream angle φ. The same applies to the relationship between the first angle α and the first upstream angle X, the second angle β and the second upstream angle Y in the third embodiment.

(5) In the above-described first embodiments, the first downstream passage 28 of the first outflow port 25 is configured to have the overlapping width W with respect to the inflow passage 21 of the inflow port 20, but the present disclosure is not limited to the embodiments. For example, the second downstream passage 33 of the second outflow port 30 may be configured to have the overlapping width W with respect to the inflow passage 21. This also applies to the third embodiment.

Also in the second embodiment, either one of the first outflow passage 26 of the first outflow port 25 or the second outflow passage 31 of the second outflow port 30 may have an overlapping width W with respect to the inflow passage 21 of the inflow port 20.

According to at least one of embodiments of the present disclosure, a three-way valve includes: an inflow port having an inflow passage configured to let fluid flow thereinto; a body having therein a valve chamber configured to introduce therein the fluid which has passed through the inflow passage of the inflow port; a first outflow port having an outflow passage extending at an acute angle to a reference direction in which the inflow passage extends, the first outflow port being configured to let the fluid flow from the valve chamber to a predetermined first flow path system; a second outflow port having an outflow passage extending from the valve chamber at an acute angle to the reference direction, the second outflow port being configured to let the fluid flow from the valve chamber to a second flow path system which is different from the first flow path system; and a valve element disposed inside the valve chamber and movable to adjust flow rates of the fluid in the first outflow port and the second outflow port. At least one of the first outflow port and the second outflow port includes: a downstream passage configured to allow the fluid pass therethrough after the outflow passage; and a bent portion disposed downstream of the outflow passage in a flow of the fluid and connecting the outflow passage and the downstream passage such that the downstream passage becomes closer to the reference direction than a direction in which the outflow passage extends is to the reference direction.

According to the three-way valve, the cooling water flowing into the valve chamber from the inflow passage of the inflow port can be distributed to the first outflow port and the second outflow port. It is possible to adjust the flow rates of the fluid flowing out from the first outflow port and the second outflow port by moving the valve element in the valve chamber.

In the three-way valve, since at least one of the first outflow port and the second outflow port is provided with the bent portion and the downstream passage, a flow of the fluid passing through the outflow passage, the bent portion, and the downstream passage can be made closer to a flow of the fluid flowing through the inflow passage. That is, according to the three-way valve, it is possible to reduce a water flow resistance in the flow toward the outflow port having the bent portion and the downstream passage, and thereby it is possible to smooth the flow of the fluid flowing toward the outflow port.

In addition, according to the three-way valve, by the bent portion and the downstream passage formed in the outflow port, it is possible to make the extending direction of the outflow port as close as possible to the extending direction of the inflow port, contributing to miniaturization of the three-way valve itself.

Furthermore, according to the three-way valve, it is possible to make an interval between pipes connected to the first outflow port and the second outflow port smaller than those in a case where the bent portion and the downstream passage are not provided. That is, by disposing the bent portion and the downstream passage in at least one of the first outflow port and the second outflow port, the three-way valve can reduce a space for disposing the fluid circuit including the three-way valve.

According to at least one of embodiments of the present disclosure, the three-way valve includes: an inflow port having an inflow passage configured to let fluid flow thereinto; a body having therein a valve chamber configured to introduce therein the fluid which has passed through the inflow passage of the inflow port; a first outflow port having an outflow passage extending at an acute angle to a reference direction in which the inflow passage extends, the first outflow port being configured to let the fluid flow from the valve chamber to a predetermined first flow path system; a second outflow port having an outflow passage extending from the valve chamber at an acute angle to the reference direction, the second outflow port being configured to let the fluid flow from the valve chamber to a second flow path system which is different from the first flow path system; and a valve element disposed inside the valve chamber and movable to adjust flow rates of the fluid in the first outflow port and the second outflow port. A pressure loss of the first flow path system is larger than a pressure loss of the second flow path system. A first angle between the outflow passage of the first outflow port and the reference direction is smaller than a second angle between the outflow passage of the second outflow port and the reference direction.

According to the three-way valve 1, the cooling water flowing into the valve chamber from the inflow passage of the inflow port can be distributed to the first outflow port and the second outflow port. It is possible to adjust the flow rates of the fluid flowing out from the first outflow port and the second outflow port by moving the valve element in the valve chamber.

In the three-way valve, the pressure loss of the first flow path system connected to the first outflow port is larger than the pressure loss of the second flow path system connected to the second outflow port, and the first angle of the first outflow port is smaller than the second angle of the second outflow port. Here, as an angle between the inflow passage of the inflow port and the outflow passage of the outflow port is larger, the pressure losses at the time of flowing out of the outflow ports become larger.

Therefore, the three-way valve 1 makes the pressure losses to be different in the three-way valve itself toward the first outflow port and toward the second outflow port. Thus, it is possible to balance the pressure loss in the first flow path system through the first outflow port and the pressure loss in the second flow path system through the second outflow port. Since both the first angle and the second angle are acute angles, the three-way valve can reduce the pressure losses in the three-way valve itself toward the first outflow port and toward the second outflow port.

Further, the sizes of the outflow passages in the outflow ports are determined by configurations of the flow path systems connected downstream thereof (e.g. pressure losses), required capacities thereof, and the like. Therefore, when the pressure losses in the flow path systems are large, there may be cases where the sizes of the outflow passages connected thereto is increased, which leads to an increase in size of the valve itself.

On this point, according to the three-way valve, the first angle and the second angle can balance the pressure loss in the first flow path system the first outflow port and the pressure loss in the second flow path system through the second outflow port. Accordingly, it is possible to reduce the size of the outflow passages and reduce the size of the three-way valve itself.

According to a third aspect of the present disclosure, the three-way valve includes: an outflow port having an outflow passage configured to let fluid flow out thereof; a body having therein a valve chamber configured to introduce therein the fluid and connected to the outflow passage of the outflow port; a first inflow port having an inflow passage extending at an acute angle to a reference direction in which the outflow passage extends, the first inflow port being configured to let the fluid flow into the valve chamber from a predetermined first flow path system; a second inflow port having an inflow passage extending from the valve chamber at an acute angle to the reference direction, the second inflow port being configured to let the fluid flow into the valve chamber from a second flow path system which is different from the first flow path system; and a valve element disposed inside the valve chamber and movable to adjust flow rates of the fluid from the first inflow port and the second inflow port. At least one of the first inflow port and the second inflow port includes: an upstream passage configured to allow the fluid pass therethrough before the inflow passage; and a bent portion disposed upstream of the inflow passage in a flow of the fluid and connecting the inflow passage and the upstream passage such that the upstream passage becomes closer to the reference direction than a direction in which the inflow passage extends is to the reference direction.

According to the three-way valve, the cooling water flowing into the valve chamber from each inflow passage of the first inflow port and the second inflow port can be joined together, and then flows out of the outflow passage of the outflow port. It is possible to adjust the flow rates of the fluid flowing in from the first outflow port and the second outflow port by moving the valve element in the valve chamber.

In the three-way valve, since at least one of the first inflow port and the second inflow port is provided with the bent portion and the upstream passage, a flow of the fluid passing through the inflow passage, the bent portion, and the upstream passage can be made closer to a flow of the fluid flowing through the outflow passage. That is, according to the three-way valve, it is possible to reduce a water flow resistance in the flow from the inflow port (i.e. at least one of the first inflow port and the second inflow port) having the bent portion and the upstream passage, and thereby it is possible to smooth the flow of the fluid flowing from the inflow port.

In addition, according to the three-way valve, by the bent portion and the upstream passage formed in the at least one of the first inflow port and the second inflow port, it is possible to make the extending direction of the inflow port as close as possible to the extending direction of the outflow port, contributing to miniaturization of the three-way valve itself.

Furthermore, according to the three-way valve, it is possible to make an interval between pipes connected to the first inflow port and the second inflow port smaller than those in a case where the bent portion and the upstream passage are not provided. That is, by disposing the bent portion and the upstream passage in at least one of the first inflow port and the second inflow port, the three-way valve can reduce a space for disposing the fluid circuit including the three-way valve.

While the present disclosure has been described with reference to various exemplary embodiments thereof, it is to be understood that the disclosure is not limited to the disclosed embodiments and constructions. To the contrary, the disclosure is intended to cover various modifications and equivalent arrangements. In addition, while the various elements of the disclosure are shown in various combinations and configurations, which are exemplary, other various combinations and configurations, including more, less or only a single element, are also within the spirit of the disclosure.

What is claimed is:

1. A three-way valve comprising:
    a body having therein a valve chamber configured to introduce therein fluid; and
    a valve element disposed inside the valve chamber to adjust a flow rate of the fluid, wherein
    the body includes:
        an inflow port having an inflow passage configured to let the fluid flow to the valve chamber;
        a first outflow port having an outflow passage extending at an acute angle to a reference direction in which the inflow passage extends, the first outflow port being configured to let the fluid flow from the valve chamber to a predetermined first flow path system; and
        a second outflow port having an outflow passage extending from the valve chamber at an acute angle to the reference direction, the second outflow port being configured to let the fluid flow from the valve chamber to a second flow path system which is different from the first flow path system,
    the valve element has a cylindrical shape and a single flow cavity, and is movable inside the valve chamber to adjust flow rates of the fluid in the first outflow port and the second outflow port, and
    at least one of the first outflow port and the second outflow port of the body includes:
        a downstream passage configured to allow the fluid to pass therethrough after the outflow passage; and
        a bent portion disposed downstream of the outflow passage in a flow of the fluid and connecting the outflow passage and the downstream passage such that the downstream passage becomes closer to the reference direction than a direction in which the outflow passage extends is to the reference direction.

2. The three-way valve according to claim 1, wherein
    a pressure loss of the first flow path system is larger than a pressure loss of the second flow path system, and
    a first angle between the outflow passage of the first outflow port and the reference direction is smaller than a second angle between the outflow passage of the second outflow port and the reference direction.

3. The three-way valve according to claim 1, wherein at least one of the first outflow port and the second outflow port has the outflow passage whose downstream end portion in a flow of the fluid in the outflow passage overlaps with the inflow passage in a direction perpendicular to a flow direction of the fluid in the outflow passage.

4. The three-way valve according to claim 1, wherein the angle between the reference direction and the direction in which the downstream passage extends is smaller than the angle between the reference direction and the direction in which the outflow passage extends.

5. The three-way valve according to claim 1, wherein the body includes a main cylindrical portion, and the inflow passage of the inflow port and the outflow passages of the first and second outflow ports are within the main cylindrical portion.

6. The three-way valve according to claim 1, wherein the body includes a cylindrical center portion, the inflow passage of the inflow port and the outflow passages of the first and second outflow ports branching off of the cylindrical center portion, and the bent portion includes bent portions disposed between the cylindrical center portion and the outflow passages of the first and second outflow ports.

7. A three-way valve comprising:
a body having therein a valve chamber configured to introduce therein fluid; and
a valve element disposed inside the valve chamber to adjust a flow rate of the fluid, wherein
the body includes:
an inflow port having an inflow passage configured to let the fluid flow to the valve chamber;
a first outflow port having an outflow passage extending at an acute angle to a reference direction in which the inflow passage extends, the first outflow port being configured to let the fluid flow from the valve chamber to a predetermined first flow path system; and
a second outflow port having an outflow passage extending from the valve chamber at an acute angle to the reference direction, the second outflow port being configured to let the fluid flow from the valve chamber to a second flow path system which is different from the first flow path system,
the valve element has a cylindrical shape and a single flow cavity, and is movable inside the valve chamber to adjust flow rates of the fluid in the first outflow port and the second outflow port,
a pressure loss of the first flow path system is larger than a pressure loss of the second flow path system, and
a first angle between the outflow passage of the first outflow port and the reference direction is smaller than a second angle between the outflow passage of the second outflow port and the reference direction.

8. The three-way valve according to claim 7, wherein at least one of the first outflow port and the second outflow port has the outflow passage whose downstream end portion in a flow of the fluid in the outflow passage overlaps with the inflow passage in a direction perpendicular to a flow direction of the fluid in the outflow passage.

9. The three-way valve according to claim 7, wherein the body includes a main cylindrical portion, and the inflow passage of the inflow port and the outflow passages of the first and second outflow ports are within the main cylindrical portion.

10. The three-way valve according to claim 7, wherein the body includes a cylindrical center portion, the inflow passage of the inflow port and the outflow passages of the first and second outflow ports branching off of the cylindrical center portion, and bent portions disposed between the cylindrical center portion and the outflow passages of the first and second outflow ports.

11. A three-way valve comprising:
a body having therein a valve chamber configured to introduce therein fluid; and
a valve element disposed inside the valve chamber to adjust a flow rate of the fluid, wherein
the body includes:
an outflow port having an outflow passage configured to let the fluid flow out of the valve chamber;
a first inflow port having an inflow passage extending at an acute angle to a reference direction in which the outflow passage extends, the first inflow port being configured to let the fluid flow into the valve chamber from a predetermined first flow path system; and
a second inflow port having an inflow passage extending from the valve chamber at an acute angle to the reference direction, the second inflow port being configured to let the fluid flow into the valve chamber from a second flow path system which is different from the first flow path system,
the valve element has a cylindrical shape and a single flow cavity, and is movable inside the valve chamber to adjust flow rates of the fluid from the first inflow port and the second inflow port, and
at least one of the first inflow port and the second inflow port of the body includes:
an upstream passage configured to allow the fluid to pass therethrough before the inflow passage; and
a bent portion disposed upstream of the inflow passage in a flow of the fluid and connecting the inflow passage and the upstream passage such that the upstream passage becomes closer to the reference direction than a direction in which the inflow passage extends is to the reference direction.

12. The three-way valve according to claim 11, wherein the angle between the reference direction and the direction in which the upstream passage extends is smaller than the angle between the reference direction and the direction in which the inflow passage extends.

13. The three-way valve according to claim 11, wherein the body includes a main cylindrical portion, and the outflow passage of the outflow port and the inflow passages of the first and second inflow ports are within the main cylindrical portion.

14. The three-way valve according to claim 11, wherein the body includes a cylindrical center portion, the outflow passage of the outflow port and the inflow passages of the first and second inflow ports branching off of the cylindrical center portion, and the bent portion includes bent portions disposed between the cylindrical center portion and the inflow passages of the first and second inflow ports.

* * * * *